US010089651B2

(12) United States Patent
Mahadevan et al.

(10) Patent No.: US 10,089,651 B2
(45) Date of Patent: *Oct. 2, 2018

(54) METHOD AND APPARATUS FOR STREAMING ADVERTISEMENTS IN A SCALABLE DATA BROADCASTING SYSTEM

(71) Applicant: CISCO TECHNOLOGY, INC., San Jose, CA (US)

(72) Inventors: Priya Mahadevan, Sunnyvale, CA (US); Glenn C. Scott, Los Altos, CA (US); Roger C. Meike, Emerald Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 784 days.

This patent is subject to a terminal disclaimer.

(21) Appl. No.: 14/195,669

(22) Filed: Mar. 3, 2014

(65) Prior Publication Data
US 2015/0248697 A1 Sep. 3, 2015

(51) Int. Cl.
*G06Q 30/00* (2012.01)
*G06Q 30/02* (2012.01)
(Continued)

(52) U.S. Cl.
CPC ..... *G06Q 30/0255* (2013.01); *G06Q 30/0212* (2013.01); *H04N 21/2396* (2013.01);
(Continued)

(58) Field of Classification Search
CPC ............ G06C 30/0255; G06C 30/0212; G06F 17/30657; H04N 21/2396;
(Continued)

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

Progress in Cryptology—AFRICACRYPT 2010, Daniel J. Bernstein, Tanja Lange, 2010, Springer, pp. 280-285.*

(Continued)

*Primary Examiner* — David J Stoltenberg
*Assistant Examiner* — Michael I Ezewoko

(57) ABSTRACT

A content broker can receive a request from a user's client device for access to a data stream, and determines whether the client device has a sufficient number of credits to consume the digital content. If the client device does not have a sufficient number of credits, the broker can provide the client device an opportunity to earn credits. The broker can send to the client device an advertisement stream, and a corresponding challenge query that includes a set of instructions for generating a challenge-response that proves the client device has consumed the advertisement stream. If the broker receives a valid challenge response from the client device, the broker can assign a predetermined number of credits to the user's account.

20 Claims, 22 Drawing Sheets

(51) Int. Cl.
  *H04N 21/81* (2011.01)
  *H04N 21/4784* (2011.01)
  *H04N 21/239* (2011.01)
  *H04N 21/2543* (2011.01)
  *H04N 21/475* (2011.01)
  *H04N 21/658* (2011.01)

(52) U.S. Cl.
  CPC ... *H04N 21/25435* (2013.01); *H04N 21/4758* (2013.01); *H04N 21/4784* (2013.01); *H04N 21/6581* (2013.01); *H04N 21/812* (2013.01)

(58) Field of Classification Search
  CPC ......... H04N 21/25435; H04N 21/4758; H04N 21/4784; H04N 21/6581; H04N 21/812; G06Q 30/0255; G06Q 30/0212
  USPC ...................................................... 705/14.53
  See application file for complete search history.

(56) References Cited

U.S. PATENT DOCUMENTS

| | | | |
|---|---|---|---|
| 4,921,898 A | 5/1990 | Lenney | |
| 5,070,134 A | 12/1991 | Oyamada | |
| 5,110,856 A | 5/1992 | Oyamada | |
| 5,506,844 A | 4/1996 | Rao | |
| 5,629,370 A | 5/1997 | Freidzon | |
| 5,870,605 A | 2/1999 | Bracho | |
| 6,052,683 A | 4/2000 | Irwin | |
| 6,091,724 A | 7/2000 | Chandra | |
| 6,173,364 B1 | 1/2001 | Zenchelsky | |
| 6,226,618 B1* | 5/2001 | Downs | G06F 21/10 380/279 |
| 6,233,646 B1 | 5/2001 | Hahm | |
| 6,332,158 B1 | 12/2001 | Risley | |
| 6,366,988 B1 | 4/2002 | Skiba | |
| 6,574,377 B1 | 6/2003 | Cahill | |
| 6,654,792 B1 | 11/2003 | Verma | |
| 6,667,957 B1 | 12/2003 | Corson | |
| 6,681,220 B1 | 1/2004 | Kaplan | |
| 6,681,326 B2 | 1/2004 | Son | |
| 6,769,066 B1 | 7/2004 | Botros | |
| 6,772,333 B1 | 8/2004 | Brendel | |
| 6,862,280 B1 | 3/2005 | Bertagna | |
| 6,901,452 B1 | 5/2005 | Bertagna | |
| 6,917,985 B2 | 7/2005 | Madruga | |
| 6,968,393 B1 | 11/2005 | Chen | |
| 6,981,029 B1 | 12/2005 | Menditto | |
| 7,013,389 B1 | 3/2006 | Srivastava | |
| 7,031,308 B2 | 4/2006 | Garcia-Luna-Aceves | |
| 7,061,877 B1 | 6/2006 | Gummalla | |
| 7,206,860 B2 | 4/2007 | Murakami | |
| 7,233,948 B1* | 6/2007 | Shamoon | H04N 21/234318 |
| 7,257,837 B2 | 8/2007 | Xu | |
| 7,287,275 B2 | 10/2007 | Moskowitz | |
| 7,315,541 B1 | 1/2008 | Housel | |
| 7,339,929 B2 | 3/2008 | Zelig | |
| 7,350,229 B1 | 3/2008 | Lander | |
| 7,382,787 B1 | 6/2008 | Barnes | |
| 7,444,251 B2 | 10/2008 | Nikovski | |
| 7,466,703 B1 | 12/2008 | Arunachalam | |
| 7,472,422 B1 | 12/2008 | Agbabian | |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,543,064 B2 | 6/2009 | Juncker | |
| 7,552,233 B2 | 6/2009 | Raju | |
| 7,555,482 B2 | 6/2009 | Korkus | |
| 7,555,563 B2 | 6/2009 | Ott | |
| 7,567,547 B2 | 7/2009 | Mosko | |
| 7,567,946 B2 | 7/2009 | Andreoli | |
| 7,580,971 B1 | 8/2009 | Gollapudi | |
| 7,623,535 B2 | 11/2009 | Guichard | |
| 7,647,507 B1 | 1/2010 | Feng | |
| 7,660,324 B2 | 2/2010 | Oguchi | |
| 7,685,290 B2 | 3/2010 | Satapati | |
| 7,698,463 B2 | 4/2010 | Ogier | |
| 7,769,887 B1 | 8/2010 | Bhattacharyya | |
| 7,779,467 B2 | 8/2010 | Choi | |
| 7,801,177 B2 | 9/2010 | Luss | |
| 7,816,441 B2 | 10/2010 | Elizalde | |
| 7,831,733 B2 | 11/2010 | Sultan | |
| 7,908,337 B2 | 3/2011 | Garcia-Luna-Aceves | |
| 7,924,837 B1 | 4/2011 | Shabtay | |
| 7,953,885 B1 | 5/2011 | Devireddy | |
| 8,000,267 B2 | 8/2011 | Solis | |
| 8,010,691 B2 | 8/2011 | Kollmansberger | |
| 8,010,795 B2* | 8/2011 | Rowley | H04L 9/3247 713/176 |
| 8,074,289 B1 | 12/2011 | Carpentier | |
| 8,117,441 B2 | 2/2012 | Kurien | |
| 8,160,069 B2 | 4/2012 | Jacobson | |
| 8,204,060 B2 | 6/2012 | Jacobson | |
| 8,214,364 B2 | 7/2012 | Bigus | |
| 8,224,985 B2 | 7/2012 | Takeda | |
| 8,225,057 B1 | 7/2012 | Zheng | |
| 8,271,578 B2 | 9/2012 | Sheffi | |
| 8,312,064 B1 | 11/2012 | Gauvin | |
| 8,375,420 B2* | 2/2013 | Farrell | H04L 9/3271 713/168 |
| 8,386,622 B2 | 2/2013 | Jacobson | |
| 8,467,297 B2 | 6/2013 | Liu | |
| 8,553,562 B2 | 10/2013 | Allan | |
| 8,572,214 B2 | 10/2013 | Garcia-Luna-Aceves | |
| 8,654,649 B2 | 2/2014 | Vasseur | |
| 8,665,757 B2 | 3/2014 | Kling | |
| 8,667,172 B2 | 3/2014 | Ravindran | |
| 8,688,619 B1 | 4/2014 | Ezick | |
| 8,699,350 B1 | 4/2014 | Kumar | |
| 8,750,820 B2 | 6/2014 | Allan | |
| 8,761,022 B2 | 6/2014 | Chiabaut | |
| 8,762,477 B2 | 6/2014 | Xie | |
| 8,762,570 B2 | 6/2014 | Qian | |
| 8,762,707 B2 | 6/2014 | Killian | |
| 8,767,627 B2 | 7/2014 | Ezure | |
| 8,817,594 B2 | 8/2014 | Gero | |
| 8,826,381 B2 | 9/2014 | Kim | |
| 8,832,302 B1 | 9/2014 | Bradford | |
| 8,836,536 B2 | 9/2014 | Marwah | |
| 8,862,774 B2 | 10/2014 | Vasseur | |
| 8,903,756 B2 | 12/2014 | Zhao | |
| 8,937,865 B1 | 1/2015 | Kumar | |
| 9,071,498 B2 | 6/2015 | Beser | |
| 9,106,964 B2* | 8/2015 | Zhao | H04N 21/4784 |
| 9,112,895 B1 | 8/2015 | Lin | |
| 9,203,816 B2* | 12/2015 | Brueck | H04N 21/2541 |
| 9,532,113 B2* | 12/2016 | Thorwirth | H04N 21/23439 |
| 2002/0010795 A1 | 1/2002 | Brown | |
| 2002/0048269 A1 | 4/2002 | Hong | |
| 2002/0054593 A1 | 5/2002 | Morohashi | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0176404 A1 | 11/2002 | Girard | |
| 2002/0188605 A1 | 12/2002 | Adya | |
| 2002/0199014 A1 | 12/2002 | Yang | |
| 2003/0046437 A1 | 3/2003 | Eytchison | |
| 2003/0048793 A1 | 3/2003 | Pochon | |
| 2003/0051100 A1 | 3/2003 | Patel | |
| 2003/0074472 A1 | 4/2003 | Lucco | |
| 2003/0097447 A1 | 5/2003 | Johnston | |
| 2003/0140257 A1 | 7/2003 | Peterka | |
| 2004/0024879 A1 | 2/2004 | Dingman | |
| 2004/0030602 A1 | 2/2004 | Rosenquist | |
| 2004/0073715 A1 | 4/2004 | Folkes | |
| 2004/0139230 A1 | 7/2004 | Kim | |
| 2004/0221047 A1 | 11/2004 | Grover | |
| 2004/0225627 A1 | 11/2004 | Botros | |
| 2004/0252683 A1 | 12/2004 | Kennedy | |
| 2005/0003832 A1 | 1/2005 | Osafune | |
| 2005/0028156 A1 | 2/2005 | Hammond | |
| 2005/0043060 A1 | 2/2005 | Brandenberg | |
| 2005/0050211 A1 | 3/2005 | Kaul | |
| 2005/0074001 A1 | 4/2005 | Mattes | |

(56) References Cited

U.S. PATENT DOCUMENTS

| | | |
|---|---|---|
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |

(56) References Cited

U.S. PATENT DOCUMENTS

| | | |
|---|---|---|
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Contemporary Cryptography, Rolf Oppliger, 2005, Artech House Computer Security Library, pp. 405-422.*
Cognition—From Memory to Creativity, Weisberg, Reeves, 2013, John Wiley & Sons, pp. 13-40, 519-527.*
Microsoft Computer Dictionary, Fifth Edition, 2002, Microsoft Press, p. 23.*
Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Language and Mind, Chomsky, Oxford University Press, 2005, p. 62.*
Computing the Mind, Shimon Edelman, Oxford University Press, 2008, pp. 26-31.*
Noetics, Lawrence Krader, 2010, Peter Lang Publishing, pp. 551-553.*
Britannica Concise Encyclopedia, Encyclopedia Britannica, 2006, p. 537.*
Explaining Creativity, Keith Sawyer, 2006, Oxford University Press, pp. 104-105.*
The Way We Think, Fauconnier, 2010, Persues Books Group, Chapter 1, Chapter 13.*
Creativity and Artificial Intelligence, Francisco Camara Pereira, Mouton de Gruyter, 2007, pp. 51-62.*
Mental Spaces, Gilles Fauconnier, Cambridge University Press, 1998, pp. xxviii-xxix.*
Digital Rights Management, Feigenbaum, Springer-Verlag, 2003, pp. 32-136.*
Security Technologies for the World Wide Web, Oppliger, Artech House, 2003, pp. 87-115, 185-247.*

(56) References Cited

OTHER PUBLICATIONS

Streetlights and Shadows, MIT Press, 2009, pp. 33-47.*
The future of the internet—and how to stop It, Yale University Press, 2008, Chapter(s) 1-9, [emphasis pp. 11-18].*
Computing Machinery and Intelligence, Mind, A Quarterly Review of Psychology and Philosophy, A.M., Turing, 1950: pp. 433-460.*
HCI remixed : reflections on works that have influenced the HCI community, MIT Press, 2008: pp. 275-279.*
Why A Diagram is (Sometimes) Worth Ten Thousand Words, Larkin, Simon, Cognitive Science, 1987, pp. 65-100.*
Contemporary Cryptography, Oppliger, Artech House, 2004, pp. 21-43.*
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd USENIX Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
B. Lynn. The Pairing-Based Cryptography Library, http://crypto.stanford.edu/pbc/.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004.
Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boner, C. Gentry, and B. Waters, 'Collusion resistant broadcast encryption with short ciphertexts and private keys,' in Proc. CRYPTO 2005, Santa Barbara, CA, USA, Aug. 2005, pp. 1-19.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," Parc, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {2013, Aug.). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Symposium (2005).
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.

(56) References Cited

OTHER PUBLICATIONS

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012}.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer ScienceVolume 5443 (2009).
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

(56) References Cited

OTHER PUBLICATIONS

Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The Pim architecture for wide-area multicast routing," IEEE/ACM Trans. on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/347Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct., 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/ publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.

(56) References Cited

OTHER PUBLICATIONS

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Biradar et al., "Review of multicast routing mechanisms in mobile ad hoc networks", Aug. 16, Journal of Network and Computer Applications 35 (2012) 221-229.
lshiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
Xie et al. "Collaborative Forwarding and Caching in Content Centric Networks", Networking 2012.

\* cited by examiner

METHOD AND APPARATUS FOR STREAMING ADVERTISEMENTS IN A SCALABLE DATA BROADCASTING SYSTEM

RELATED APPLICATIONS

The subject matter of this application is related to the subject matter of the following applications:

U.S. patent application Ser. No. 14/092,680, entitled "Method and Apparatus for Scalable Data Broadcasting," by inventors Priya Mahadevan, Roger C. Meike, and Glenn C. Scott, filed on 27 Nov. 2013;

U.S. patent application Ser. No. 14/195,717 (Now U.S. Pat. No.9,147,051), entitled "Method and Apparatus for Maintaining Content View Statistics in a Named Data Network," by inventors Priya Mahadevan, Glenn C. Scott and Roger C. Meike, filed on 3Mar. 2014; and U.S. patent application Ser. No. 14/222,330 (Now U.S. Pat. No. 9,916,601), entitled "A Marketplace for Presenting Advertisements in a Scalable Data Broadcasting System," by inventors Priya Mahadevan, Roger C. Meike, and Glenn C. Scott, filed on 21, Mar. 2014;

the disclosures of which are incorporated by reference in their entirety herein.

BACKGROUND

Field

This disclosure is generally related to publishing digital content. More specifically, this disclosure is related to streaming advertisements to pay for access to a data stream over a network, such as the Internet, an Information Centric Network (ICN), a client-server architecture, or a peer-to-peer network.

Related Art

In the modern digital economy, content producers can publish their content in digital form through one or more streaming or broadcasting services to earn revenue through various revenue models. Music producers, for example, oftentimes license their music to online streaming radio stations that earn money by broadcasting advertisements to their listeners over a computer network. The music producers may also license their music content to music recommendation services that tailor song and advertisement selections to each consumer (e.g., the Pandora streaming service from Pandora Media Inc.).

Similarly, movie and television-show producers can license their digital content to video streaming services that allow consumers to view movies or shows over the Internet. Some of these video streaming services negotiate a licensing fee with each producer, and earn revenue by charging consumers a flat monthly fee (e.g., Netflix, Inc.), and/or by presenting advertising commercials to consumers (e.g., Hulu.com).

These streaming services typically attempt to secure a publisher's digital content by requiring their customers to use the service's custom software application to receive the media stream. Netflix and Hulu, for example, deploy proprietary video streaming applications that make it difficult for a user to illegally copy a media stream by not allowing the user to "save" the media stream to a local disc. However, it is possible for consumers to use third-party applications that snoop on network traffic in order to save the media stream to disc. Once the consumer has saved a copy of the media stream, it is possible for the consumer to illegally share the media stream anonymously given that the media streaming service typically transmits identical copies of the media stream to many consumers.

Cable and Satellite broadcasting companies, on the other hand, provide traditional television broadcasts to consumers over a secured digital infrastructure. A broadcasting company typically provisions a consumer's client device (e.g., as a set-top box device) when the consumer subscribes to a service from the broadcasting company. This provisioning process verifies that the client device is associated with a paying customer, and configures the device to detect and present the broadcasted media to the paying customer.

These broadcasting companies typically encrypt each media stream using a stream-specific key before broadcasting each media stream to a group of subscribers. Each client device receives a key from the broadcasting company (e.g., periodically), and uses the key to decrypt the media stream just before presenting the media stream to the user. However, it is possible for a consumer to save the broadcasted media stream to disk once the media stream has been decrypted, for example, by using a high-definition multimedia interface (HDMI) capture card on a computer. Also, because the broadcasting company transmits the same media stream to the group of consumers, it is possible for the consumer to duplicate and illegally share the media stream with others anonymously.

SUMMARY

One embodiment provides a data-publishing system that facilitates broadcasting a data stream to a plurality of authorized client devices. A publisher can protect the data stream from unauthorized access by converting the data stream into an encoded data stream that by itself cannot be used to reproduce the original data stream. The publisher can also generate an "encoding sauce" that includes instructions for converting the encoded data stream into a new stream that can be used by authorized users.

The publisher can designate one or more brokers to authorize user access to the data stream. A broker can receive a request for the data stream from a user, and can process the request to obtain authorization or identification information for the user. If the user can be allowed to access the data stream, the broker can grant the user access to the data stream by generating a "secret sauce" that the user's computing device can use to decode the encoded data stream. In some embodiments, the broker does not need to generate a unique secret sauce from the base sauce. For example, some encoded data streams might not need a secret sauce to decode the stream. The broker can forward the encoding sauce to a client device, which allows the client device to process the encoded data stream to reproduce the original data stream (whose contents are not personalized for each client).

When the user's client device requests the data stream from the publisher, the publisher can redirect the client device to a broker that controls access to the data stream's contents. The client device can obtain the encoded data stream from the publisher (or from any other source), and obtains a secret sauce stream from the broker. The client device processes the encoded data stream using the secret sauce stream to produce a personalized data stream that includes the data stream's contents. The broker can also provide advertisements and/or personalized coupons to a user's client device as a way to pay for the data stream. If the user is presented with a coupon as an advertisement, the user can redeem the coupon to obtain a product or a service at a discounted price or for free. For example, the user can use a code printed on the coupon to redeem the coupon via a website or mobile application associated with the advertiser. Alternatively, the user can print the digital coupon, and can present the printed coupon at a brick-and-mortar venue associated with the advertiser.

The following terms describe elements of a data-publishing system:

Data Stream: A collection of data that is to be published. Examples include an audio file, a video stream, a data file, an executable file, etc.

Base Sauce: Instructions for generating an encoded data stream, and for generating an encoding sauce that can be provided to a trusted broker that processes requests for the data stream.

Encoded Data Stream: A collection of data that can be provided to any client device, a cache, or any computer in a network. Client devices cannot decode the original data stream directly from the encoded data stream alone.

Encoding Sauce: Instructions for generating a secret sauce that is typically unique to a client device or incorporates a unique client identifier (ID), etc.

Secret Sauce: Instructions for modifying an encoded data stream to produce a personalized data stream that is tailored to the requesting client device or ID.

Personal Data Stream: A collection of data whose contents may be personalized to the requesting client device or user. The personalized data stream can include digital watermarks that encode a unique identifier for the client device or ID. The personalized data stream's contents can also include additional data that is tailored to the client device or its user.

Advertisement Challenge: The broker can provide an advertisement challenge to a client device along with an advertisement that is to be presented to the user. The advertisement challenge can include a set of instructions that allow the client device to compute a challenge-response, from the advertisement, that proves the client device has consumed the advertisement. The client device has "consumed" the advertisement (or a personalized digital coupon) when the client device has obtained the advertisement from a remote device, and has processed the advertisement to present the advertisement to a local user.

Challenge Response: A challenge response includes one or more pieces of data derived from an advertisement stream that prove a client device has consumed an advertisement. The challenge question is dynamically generated, and can vary over time. This way, even if the same ad is presented again to the same client device at a later date, the client device would need to generate a new challenge response for the advertisement. The client device cannot use a previously computed response as the challenge response. This also prevents client devices from sharing a challenge response with other clients, as each client would get a different challenge question when presented with the same advertisement.

Advertisement Token: An advertisement token is an encrypted data packet that includes a challenge response for an advertisement or a personalized coupon. The advertisement token can be signed by a user's or a client device's private key. Each advertisement token can be worth a predetermined number of credits that a user can use to consume a data stream from the broker.

When a broker receives a request from a client device for access to a data stream, the broker determines digital content requested by the client device, and determines whether the client device has a sufficient number of credits to consume the digital content. If the client device does not have a sufficient number of credits, the broker can provide the client device an opportunity to earn credits. If the client device does have a sufficient number of credits, the broker can obtain a base sauce for the digital content, and obtains a public key for the client device from the request. The broker can then generate a secret sauce for the client device based on the base sauce and the client's public key, or any client identifier that is unique to the client device. The client device can use this secret sauce to process an encoded data stream, and generate a personalized data stream that can be used to present the requested content to the user.

In some embodiments, the broker determines that the client device has a sufficient number of credits by determining that the digital content does not require credits, or determining that a user of the client device has a sufficient number of valid advertising tokens from viewing advertisements. The broker can also determine that the client device has a sufficient number of credits by determining that the user has paid to access the digital content, or by determining that the user has a subscription with the broker to obtain digital content.

In some embodiments, while providing the client device an opportunity to earn credits, the broker can provide, to the client device, a request to obtain a payment for the credits.

In some embodiments, while providing the client device an opportunity to earn credits, the broker can generate a unique challenge query for an advertisement stream that is to be presented to the user during the opportunity. The unique challenge query is specific to the current opportunity, and includes a set of instructions for generating, from the advertisement stream, a challenge-response that proves the client device has consumed the advertisement stream. The broker then sends, to the client device, a list of one or more advertisement streams, and a corresponding list of unique challenge queries. For example, the challenge query can include instructions that cause the client device to obtain an nth byte in the advertisement object. The client device can execute the challenge's instructions to extract the $n^{th}$ byte from the advertisement, and to generate a challenge-response packet that includes the extracted $n^{nth}$ byte. The byte that is to be extracted can be different for each time the advertisement is to be presented to the client device or another client device. The broker may then receive a challenge-response from the client device. In response to determining that the received challenge-response is valid, the broker may determine a number of credits associated with the advertising stream, and can assign the determined number of credits to the client's account.

In some variations to these embodiments, the broker determines whether the challenge-response is valid by verifying whether the challenge response matches an expected response.

In some embodiments, the broker may receive the challenge-response in a packet encrypted using the broker's public key, such that the encrypted packet includes one or more of a challenge response signed using the client device's private key, and the client device's public key.

BRIEF DESCRIPTION OF THE FIGURES

In the figures, like reference numerals refer to the same figure elements.

DETAILED DESCRIPTION

Figure 1:
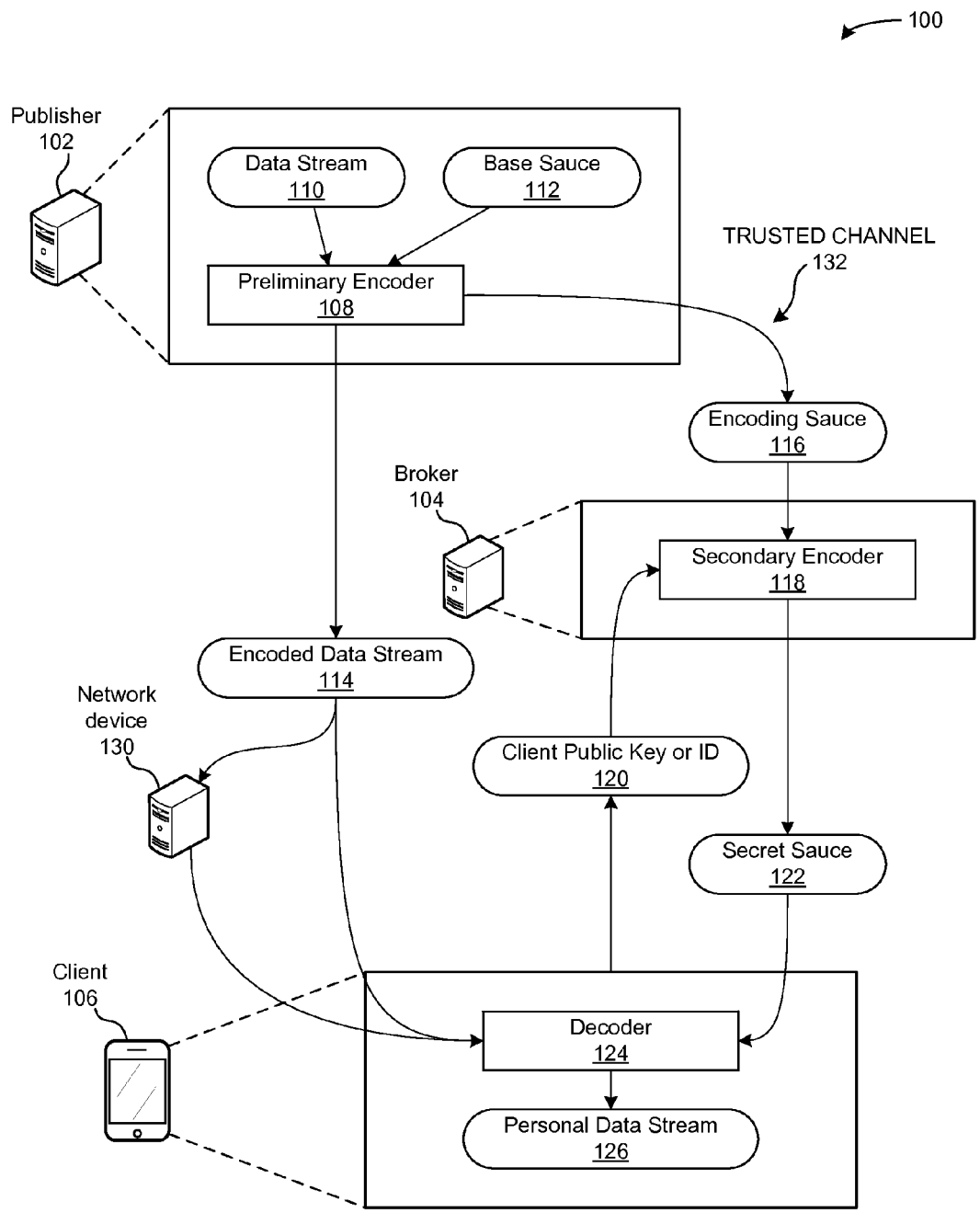
FIG. 1 illustrates an exemplary computing environment that facilitates brokering access to digital content in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a data-publishing system that solves the problem of broadcasting a data stream across a computer network, while only allowing authorized devices to consume the data stream. A data publisher can use the data-publishing system to publish a data stream so that each authorized recipient obtains a personalized version of the data stream. The data stream can include a live video or audio stream, a recorded video or audio stream, an executable file (e.g., binary code), a digital document or image, etc.

For example, a publisher can broadcast a live or pre-recorded media stream to a plurality of consumers in a secure way by encoding or damaging the media stream so that the stream's contents cannot be reproduced from the encoded stream alone. The publisher also configures one or more brokers to control access to the media stream by providing these brokers with an encoding "sauce" that indicates how to decode or fix the media stream in a way that generates a personalized stream for each recipient.

A broker can use the encoding sauce to generate a secret sauce for each valid recipient of a data stream. Each recipient's client device can receive segments of the encoded data stream from the publisher itself, and/or from any other network device that has cached the encoded data stream segments. These devices then use the secret sauce that they may have obtained from the broker to decode or fix the encoded data stream in a way that personalizes the data stream for that recipient. In some embodiments, a personalized data stream can include a digital watermark that encodes an identifier of the stream's intended recipient. This allows a publisher to analyze a pirated data stream, such as a movie, to determine who has allowed the data stream to be copied illegally.

In some embodiments, the publisher can generate the encoded data stream by extracting a plurality of small data segments that are critical for presenting or otherwise making use of the data stream. These extracted data segments can be provided to a client device via a secret sauce stream that requires a significantly lower bandwidth than the encoded data stream. The secret sauce stream can include instructions which indicate how the extracted data segments are to be inserted back into the encoded data stream. For example, these instructions can map each data segment of the secret sauce stream to a byte offset of the encoded data stream. The client device can receive the high-bandwidth encoded data stream from the publisher or from a data-cache over an information centric networking (ICN) system, or through any computer network now known or later developed. Also, the client device can receive the low-bandwidth secret sauce stream from the broker, or from any other entity which the broker has designated to generate and/or disseminate secret sauce streams for a given set of users or client devices.

FIG. 1 illustrates an exemplary computing environment 100 that facilitates brokering access to digital content in accordance with an embodiment. Environment 100 can include publishers, brokers, and client devices, which can each be coupled to any wired or wireless computer network now known or later developed. A publisher 102 can publish a data stream as an encoded data stream, and only authorized clients can get access to the secret sauce from the broker. Any client device can access the encoded data stream directly from the publisher, or from any other devices that store a copy of the encoded data stream (e.g., a cache, or other network devices). However, only authorized devices (e.g., client device 106) can use the secret sauce to convert the encoded data stream into a personalized data stream. The encoded data stream is itself useless to client devices that do not have a valid secret sauce for decoding the stream.

Publisher 102 can include a primary encoder 108 that uses a base sauce 112 to encode a data stream 110. Base sauce 112 can be specific to data stream 110, or can be re-used for a plurality of data streams from publisher 102. Base sauce 112 can include instructions for generating an encoded data stream 114, and for generating an encoding sauce 116 that can be provided to a trusted broker that processes requests from clients for the data stream. Encoded data stream 114 can include a collection of data objects that can be provided to any client device or computer in a network, without the risk of revealing the data stream's contents to unauthorized users. A user's client device cannot decode the original data stream from encoded data stream 114 alone.

Publisher 102 uses base sauce 112 to generate encoded sauce 116 for encoded data stream 114, and provides encoding sauce 116 to a broker 104 over a trusted channel 132. Encoding sauce 116 can include instructions used by broker 104 to generating a "secret sauce" for a client device that has valid privileges. Broker 104 is responsible for granting access to secret sauce 122 only to users that have valid access privileges.

In some embodiments, broker 104 can include a secondary encoder 118 that uses encoding sauce 116 to generate secret sauce 122 for client 106. Secondary encoder 118 can generate secret sauce 122 for client 106 in advance (e.g., before receiving a request for secret sauce 122), or in response to receiving a request from client 106. For example, when client device 106 requests data stream 110 from publisher 102, publisher 102 can respond to the request by providing encoded data stream 114 to client 106, and redirecting client 106 to obtain secret sauce 122 from broker 104.

In some embodiments, client device 106 can obtain encoded data stream 114 from any network device 130 that stores encoded data stream 114, such as a cache sever, a CDN server, or any peer-2-peer device. Client device 106 can process encoded data stream 114 by accessing secret sauce 122, which is controlled by broker 104. Client 106 can access secret sauce 122 by sending a request to broker 104, such that the request can include a client public key or identifier (ID), or any other form of authentication such as user-id/password for client 106.

If broker 104 determines that client 106 has valid access privileges, secondary encoder 118 can use encoding sauce 116 to generate secret sauce 122 based on the public key or the ID for client 106. Secret sauce 122 includes instructions for modifying encoded data stream 114 to produce a personalized data stream 126 that is tailored to client 106. Broker 104 then sends secret sauce 122 to client 106.

Client 106 includes a decoder 124 that processes encoded data stream 114 using secret sauce 122 to generate personalized data stream 126. Personalized data stream 126 can include a stream or collection of data objects whose contents may be personalized to client 106 or a user of client 106. Personalized data stream 126 can include digital watermarks that encode a unique ID for client 106 or its user, and/or can include additional data that is tailored to the client device or its user.

In some embodiments, a publisher can broadcast an encoded data stream to a plurality of devices over an information-centric network. In ICN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data network (NDN) or a content-centric network (CCN) are examples of ICN architecture; the following terms describe elements of an NDN or CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in an ICN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

Figure 2:
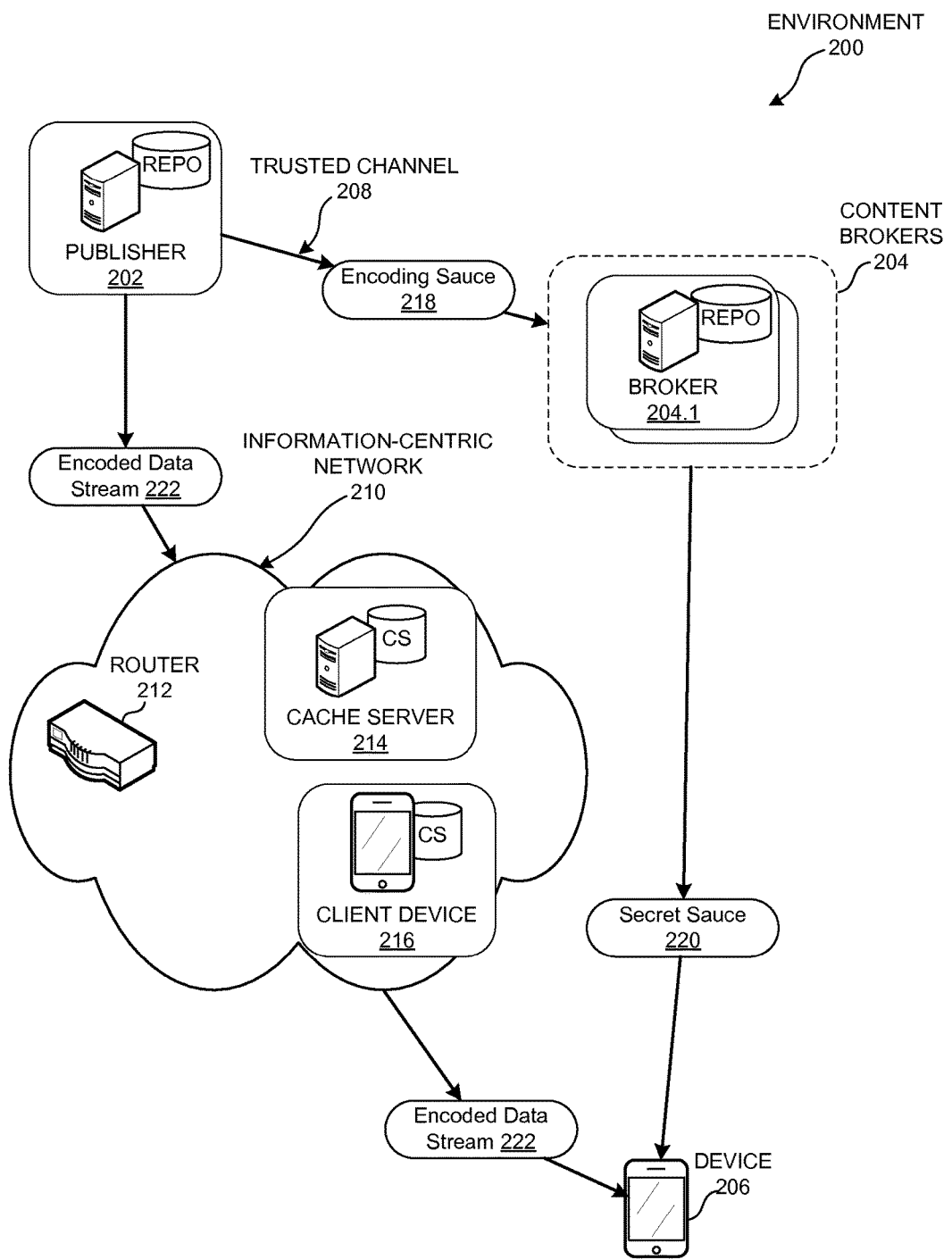
FIG. 2 illustrates an exemplary computing environment that facilitates brokering access to digital content over an information-centric network in accordance with an embodiment.

FIG. 2 illustrates an exemplary computing environment 200 that facilitates brokering access to digital content over an information-centric network 210 in accordance with an embodiment. Environment 200 can include a publisher that publishes a data stream, and one or more brokers 204 that control access to the data stream. Specifically, publisher 202 can include a computing device that disseminates an encoded data stream 222 over an information-centric network 110.

Publisher 202 can publish the data stream by generating an encoded data stream 222, and disseminating encoded data stream 222 over information-centric network 210. Encoded data stream 222 may be encoded, for example, by extracting every $n^{th}$ byte (e.g., $100^{th}$ byte) from the original data stream. Publisher 202 can also generate an encoding sauce 218 for encoded data stream 222, and can provide encoding sauce 218 to one or more of brokers 204 over a trusted channel 208 (e.g., a secure network connection or a tangible storage device). Publisher 202 can encrypt encoding sauce 218 using a public key from a broker 204 (or using a private key that belongs to publisher 202), and can sign encoding sauce 218 using a digital certificate. Encoding sauce 218 can include the data segments that have been extracted from the original data stream (e.g., every $100^{th}$ byte of the original data stream), as well as instructions indicating how these data segments are to be re-inserted into encoded data stream 222. Encoding sauce 218 can also indicate instructions for modifying one or more of the extracted data segments to generate digital watermarks for a user.

In some embodiments, environment 200 can also include a client device 206 that can obtain encoded data stream 222 via information-centric network 210, and can obtain a secret sauce 220 for the data stream from broker 204.1 either via information-centric network 210 or via any other computer network now known or later developed. Client device 206 can include a smartphone, a tablet computer, or any other computing device such as a laptop computer, a desktop computer, etc. To obtain encoded data stream 222, device 206 can disseminate a request for encoded data stream 222 over information-centric network 210 (or an Interest for encoded data stream 222 over content-centric network 210). Publisher 202 can satisfy the request or Interest by returning a packet that includes a unique name for encoded data stream 222, and identifies a broker (e.g., broker 204.1) that is to control access to the data stream.

In some embodiments, client device 206 can disseminate one or more Interests for encoded data stream 222, such that each Interest corresponds to a portion of encoded data stream 222. The Interest may be satisfied by publisher 202, or by any device within information-centric network 210. For example, in some embodiments, one or more of the Content Objects for encoded data stream 222 may be cached within a content store (CS) within a router 212, a cache server 214, and/or a peer client device 216. Recall that encoded data stream 222 itself cannot be used to reproduce the data stream's contents. Hence, in some embodiments, any device within information-centric network 210 can cache Content Objects for encoded data stream 222 without sacrificing its security, and at the same time reducing the load on publisher 202 as the number of Interests that need to be processed by publisher 202 are significantly reduced.

Client device 206 can gain access to the contents of encoded data stream 222 by disseminating one or more Interests for the data stream's secret sauce stream. Broker 204.1 can use the publisher's encoding sauce to generate secret sauce Content Objects that satisfy these Interests (e.g., secret sauce 220), and that are customized for client device 206. Broker 204 can encrypt each secret sauce Content Object using a public key from a client device 206 (or the broker's own private key), and can sign these Content Objects using a local digital certificate. Client device 206 then processes encoded data stream 222 using the secret sauce stream (e.g., secret sauce 220) to generate a personalized data stream for the user.

In some embodiments, broker 204.1 generates a plurality of secret sauce objects for the data stream, such that each secret sauce object decodes a portion of the encoded data stream. For example, broker 204.1 can generate a secret sauce object for each of the encoded data stream's Content Objects or for a set of media segments. As another example, if the encoded data stream corresponds to a media stream, publisher 202 can partition the media stream into a plurality of media segments, and broker 204.1 can generate a secret sauce Content Object for each media segment. This way, broker 204.1 can require device 206 to display a set of commercials before receiving a secret sauce object for a subsequent segment of the encoded media stream that are to be presented after the commercials.

Further, given that broker 204.1 needs to generate a secret sauce stream for each client device that has valid access to the data stream, broker 204.1 can restrict access to the data stream based on pre-determined data-restricting criteria, and can keep track of various data-access analytics for various data streams. For example, broker 204.1 can restrict access to only client devices that have purchased the data stream, that have subscribed into a data-streaming service (e.g., an online video streaming service, such as Netflix), and/or that belong or do not belong to a predetermined demographic (e.g., the recipient does not meet an 18-year old age requirement).

Broker 204.1 can also keep track of which client devices have accessed which data streams, how much of a data stream they have accessed, consumer demographic information for each data stream, etc. When the data stream corresponds to a media stream, broker 204.1 can also keep track of which advertisements have been viewed during each media stream or by each consumer, a revenue amount that has been generated from each media stream or from each consumer, etc. Broker 204.1 can use these analytics to bill users for the data streams they have accessed, to bill users for a tiered subscription service to various data streams, to determine a user's stream-preference information, etc.

Also, given that each secret sauce stream can include executable instructions, broker 204.1 can use the secret sauce stream and analytics information to insert user-targeted advertisements into the media stream presented by the client device. Broker 204.1 can select a user-targeted advertisement for a client device based on the analytics information, and generates the secret sauce stream to include instructions that insert or embed the advertisement into an existing media stream. For example, a movie may include an image of a soda bottle with a label. The label in the original media stream may be for a generic brand, or for a brand that paid for product placement into the movie while the movie was being presented at movie theaters. However, once the movie enters the video-rental market, other advertisers may pay to have their brand's label overlaid into the movie for a pre-negotiated number of times, and/or for a predetermined audience demographic. Hence, these advertisement-inserting instructions can configure the client device to embed or overlay an image or media segment over one or more frames of the media stream, so that the second brand's label is displayed on top of the bottle's initial label.

In some embodiments, client device 206 can include a data publisher, and data-brokering capabilities. For example, a user can use a personal computing device, tablet computer, or cell phone to generate digital content (e.g., a video file, an audio file, or a document). The user's computing device can encode this digital content, and can broker which local users or which remote devices can have access to the digital content.

Publishing a Data Stream

Any entity (e.g., a person or organization) that generates or owns digital content can utilize the data-publishing system (also referred to herein as a "publisher") to make the digital content available to others. These entities may include a film maker or movie producer that owns various movies or television programs, a musician or music producer, a software developer, etc. The data publisher can generate encoded data streams for his digital content, and to generate an encoding sauce that allows a broker to control access to the digital content.

Figure 3:
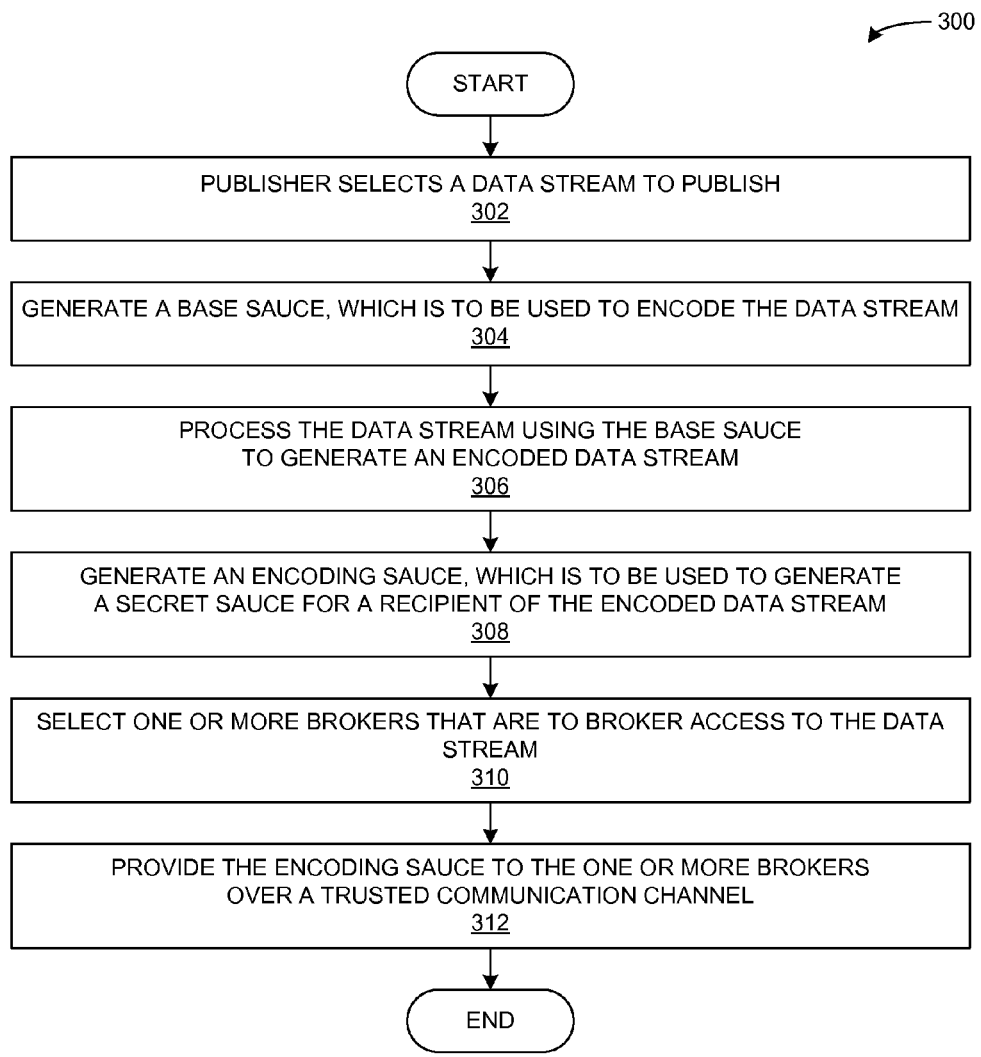
FIG. 3 presents a flow chart illustrating a method for publishing a data stream in accordance with an embodiment.

FIG. 3 presents a flow chart illustrating a method 300 for publishing a data stream in accordance with an embodiment. During operation, the publisher selects a data stream to publish (operation 302), and generates a base sauce that can be used to encode the selected data stream (operation 304). The base sauce can include instructions that generate an encoded data stream, for example, by extracting one or more data segments from the base data stream. The publisher then processes the data stream using the base sauce to generate the encoded data stream (operation 306), and can cache the encoded data stream locally, or on a remote data repository. In some embodiments, the publisher can receive a request or an Interest for the data stream from a client device, and the publisher can return the encoded data stream to satisfy the request or the Interest. In some other embodiments, a client device can disseminate a request or Interest for the encoded data stream across an information-centric network, and receives the encoded data stream from the media repository, an intermediate cache, or any peer network device that can satisfy the request or Interest.

The publisher also generates an encoding sauce for the data stream (operation 308). This encoding sauce includes instructions that allow a data broker to generate a secret sauce for a recipient of the encoded data stream. In some embodiments, the encoding sauce specifies instructions for generating watermarks that encode a recipient's identifier, and specifies locations of the data stream where these watermarks are to be inserted. The publisher can select one or more brokers that are to broker access to the data stream (operation 310), and provides the encoding sauce to the one or more brokers (operation 312). In some embodiments, the publisher can provide the encoding sauce to a broker over a secure channel. Also, in some embodiments, the broker can designate one or more additional sub-brokers that are to control access to the data stream. Each sub-broker may, for example, be configured to respond to requests from a particular geographic region, from a given set of client devices, etc.

Figure 4:
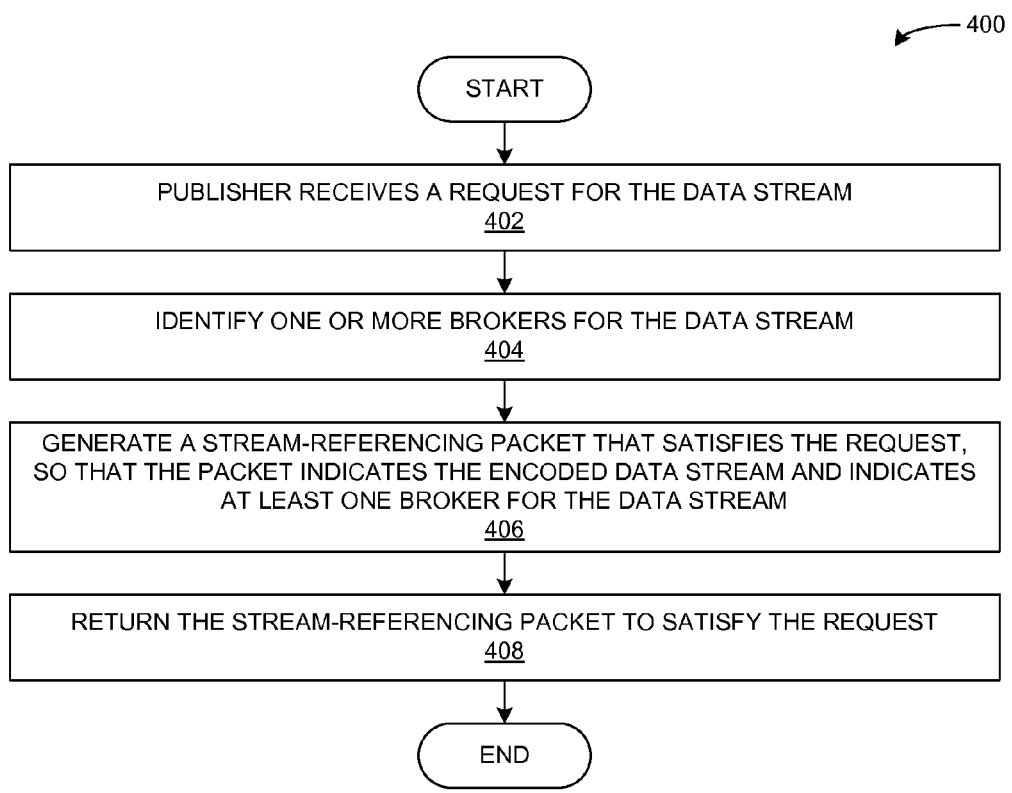
FIG. 4 presents a flow chart illustrating a method for assigning a broker to a data-consuming client device in accordance with an embodiment.

FIG. 4 presents a flow chart illustrating a method 400 for assigning a broker to a data-consuming client device in accordance with an embodiment. During operation, the publisher can receive a request for a data stream (operation 402), and identifies one or more brokers which have been provisioned to broker access to the data stream (operation 404). The request can include an Interest received over a named-data network. To satisfy the request, the publisher generates a stream-referencing packet that includes a name of the encoded data stream and/or includes at least a portion of the data stream. The stream-referencing packet also includes at least one broker for the data stream (operation 406). The publisher then returns the stream-referencing packet to satisfy the request or Interest (operation 408). The stream-referencing packet can include a Content Object that is returned over a named-data network to satisfy an Interest message.

In some embodiments, a publisher can analyze a pirated copy of the data stream that has been illegally copied to identify the copy's first recipient.

Figure 5:
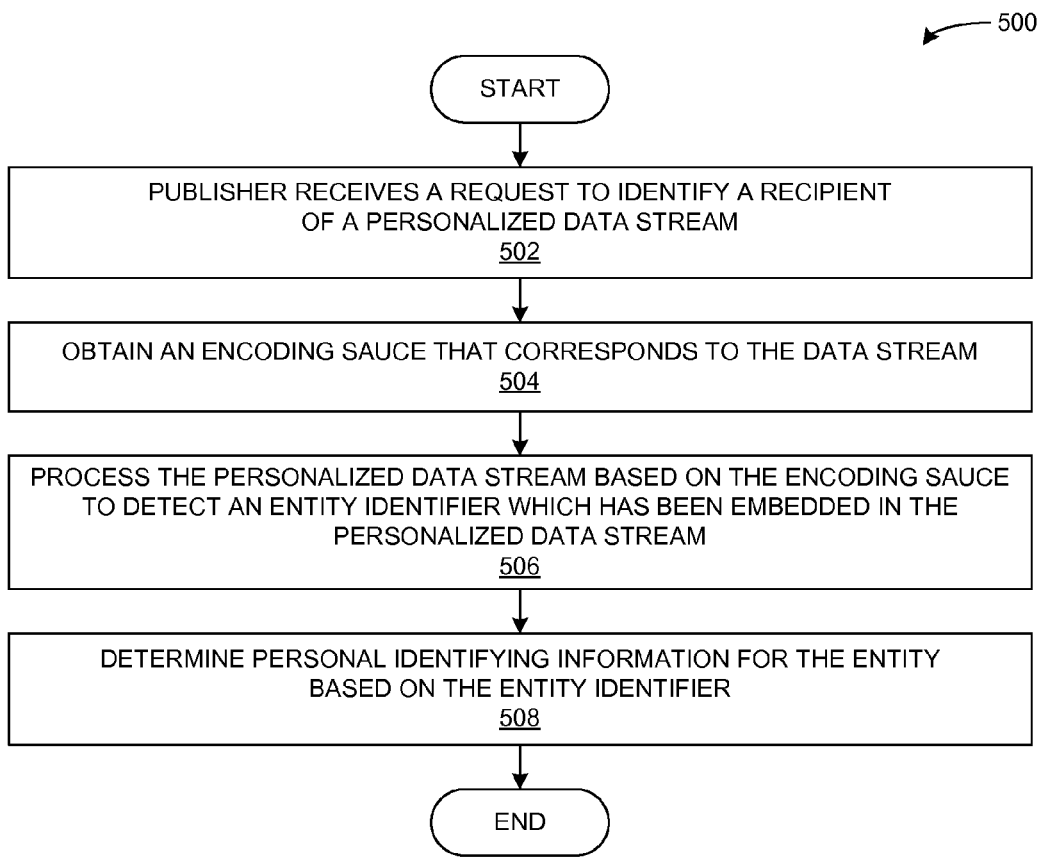
FIG. 5 presents a flow chart illustrating a method for identifying an entity for whom a given personalized data stream was generated in accordance with an embodiment.

FIG. 5 presents a flow chart illustrating a method 500 for identifying an entity for whom a given personalized data stream was generated in accordance with an embodiment. During operation, the publisher can receive a request to identify a recipient of a personalized data stream (operation 502), and obtains an encoding sauce that corresponds to the data stream (operation 504). Recall that the encoding sauce can indicate instructions for generating and inserting digital watermarks into the data stream. The publisher processes the personalized data stream based on the instructions in the encoding sauce to detect an entity identifier from digital watermarks that have been embedded in the personalized data stream (operation 506).

For example, the encoding sauce may have configured a broker to perform an exclusive-OR (XOR) operation between a user's unique identifier and various segments of the base data stream to generate various watermarks for the personalized data stream. Hence, the publisher can obtain the user's identifier from the watermarks by deducing the user's identifier from one or more watermarks that have been inserted into various segments of the personalized data stream. To deduce the user's identifier, the publisher can perform another XOR operation between a watermark and a segment of the data stream from which the watermark was generated. The publisher can then use this user identifier to determine personal identifying information for the user (operation 508).

Brokering Access to Data Streams

A data broker can include any online service that controls access to digital content. For example, a large set of users may have registered with the broker to obtain digital content by either purchasing the digital content, renting the digital content, paying for a subscription to access the digital content, or by agreeing to view periodic advertisements in exchange for access to the digital content. Publishers can sell their digital content to the broker, or can engage in a business arrangement with the broker. The broker can use a publisher's digital content to generate revenue, and can return a pre-negotiated portion of this revenue to the publisher. This allows publishers, regardless of their monetary or business resources, to earn money from their digital content by leveraging the broker's access to advertisers and paying consumers.

In some embodiments, the data broker and the publisher can reside on the same system. For example, a publisher can deploy a data-brokering service to control access to their digital content, and to control how this digital content is leveraged to earn revenue. Some digital content can be broadcasted for free and without commercials, while other digital streams require consumers to pay for the content and/or to view commercials and product placements within the digital content.

In some embodiments, a broker can generate a secret sauce for other sub-brokers. Each broker generates an encoding sauce by signing and stamping the encoding sauce, and inserting an identifier for a sub-broker into the encoding sauce. For example, a top-level broker (or a mid-level broker) can generate the encoding sauce to include a watermark for a sub-broker, and to include an encoding sauce for the sub-broker. The top-level broker then signs the encoding sauce before sending the encoding sauce to a sub-broker. The sub-broker can use the encoding sauce to generate a secret sauce for a client device, or to generate an encoding sauce for another sub-broker.

A sub-broker can generate a secret sauce that includes the watermarks from the parent broker's encoding sauce (e.g., watermarks for the local sub-broker, and other higher-level brokers), as well as additional watermarks for the client device. Hence, when the client device processes the encoded data stream using the secret sauce, the client device generates the personalized data stream by inserting watermarks for one or more brokers and for the client device into various locations of the personalized data stream as indicated by the secret sauce.

Figure 6:
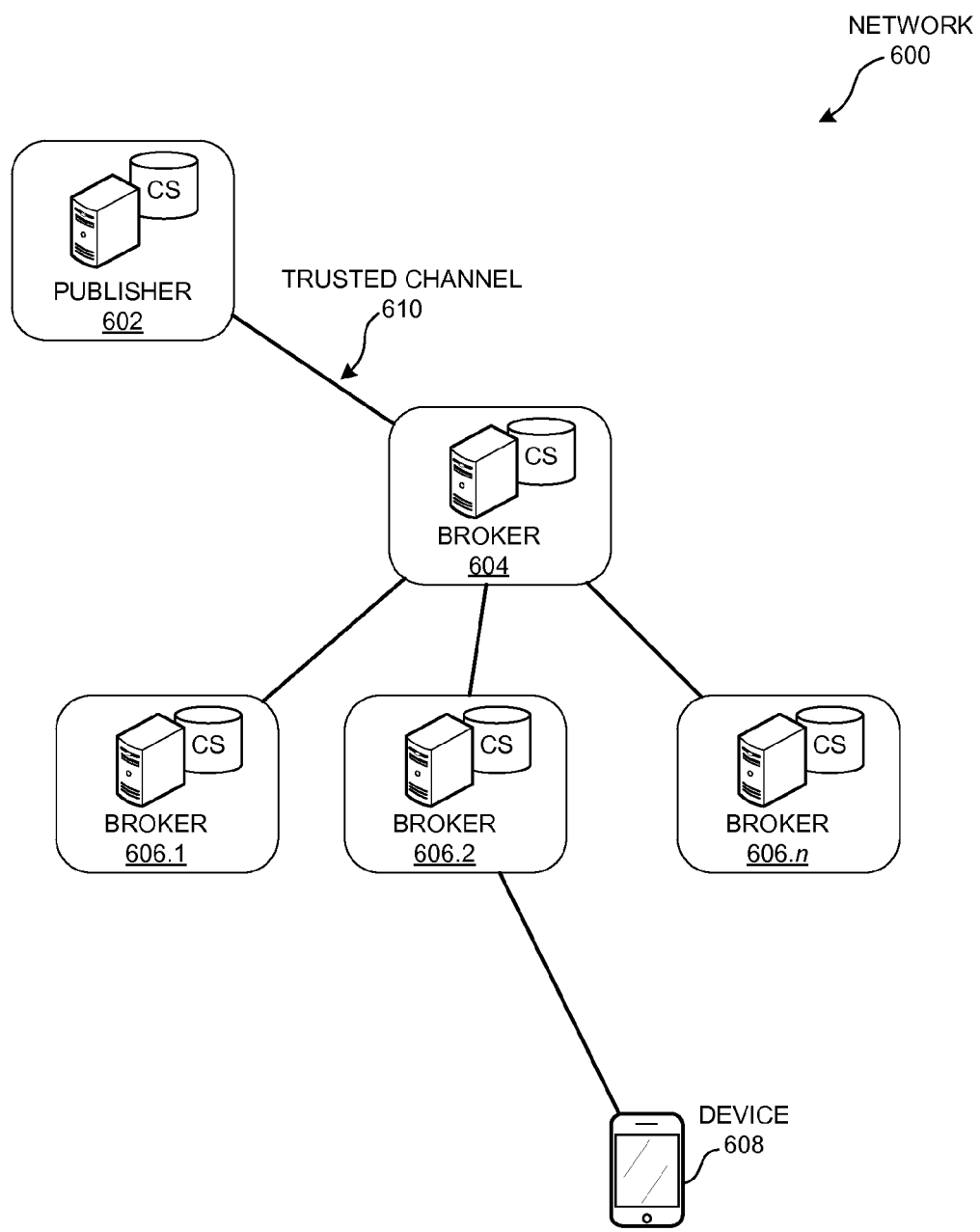
FIG. 6 illustrates a hierarchy of brokers in accordance with an embodiment.

FIG. 6 illustrates a hierarchy of brokers in accordance with an embodiment. Network 600 can include one or more publishers 602 that publish one or more data streams by providing an encoding sauce to a top-level broker 604 for each data stream. Top-level broker 604 can assign a sub-broker 606 to each data stream by generating another encoding sauce for the sub-broker (e.g., sub-broker 606.2), and providing the encoding sauce to the sub-broker.

Recall that when a client device 608 requests a data stream from publisher 602, publisher 602 can return a packet that indicates a name for the data stream, and indicates a name for the data stream's secret sauce stream. This allows client device 608 to obtain packets for the data stream and for the secret sauce stream from devices across an information-centric network. In some embodiments, when top-level broker 604 sends an encoding sauce for a data stream to sub-broker 606.2, sub-broker 606.2 advertises that it generate and return a secret sauce stream for this data stream. Hence, when client device 608 disseminates a request or an Interest for a secret sauce packet that corresponds to the data stream, this request or Interest can flow to broker 606.2 over the information-centric network.

Checksums

Figure 7A:
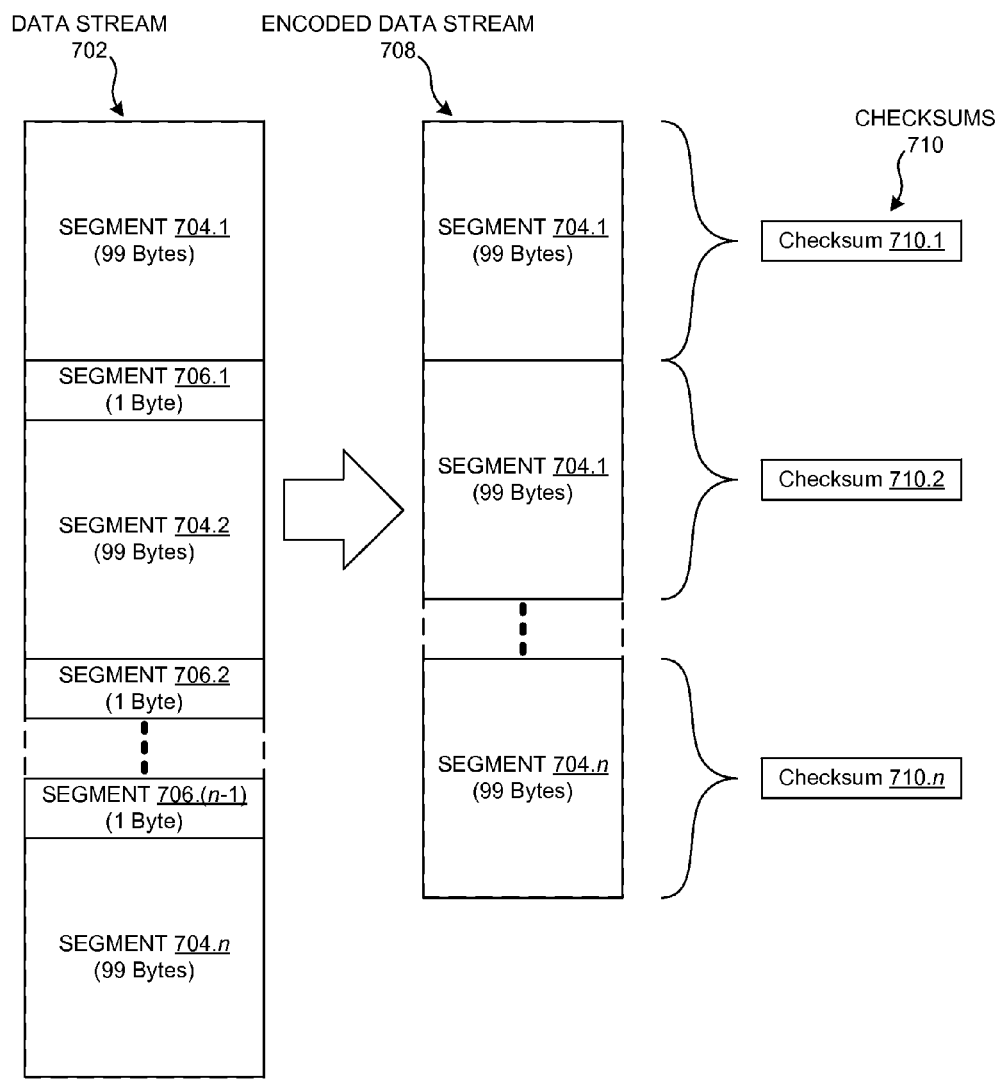
FIG. 7A illustrates an encoded data stream and a set of checksums which have been generated from a base data stream in accordance with an embodiment.

FIG. 7A illustrates an encoded data stream 708 and a set of checksums 710 which have been generated from a base data stream 702 in accordance with an embodiment. Specifically, a publisher can encode data stream 702 by removing small portions of the data stream so that the encoded data stream no longer includes sufficient information for reproducing or otherwise making use of the data stream's contents. For example, the publisher can remove a predetermined percentage of bits from data stream 702 (e.g., one percent) by extracting segments 706 from data stream 702, and generating encoded data stream 708 to include the remaining data segments 704. The publisher can upload encoded data stream 708 to a content server, and can provide encoded data stream 708 to network devices and client devices across an information-centric network.

In some embodiments, each of data segments 706 can be of equal size, and can be evenly distributed across data stream 702. In some other embodiments, segments 704 together are approximately equal to the predetermined percentage of data stream 702, and each of segments 704 can be obtained from portions of data stream 702 that are critical to reproducing the data stream's contents (e.g., from I frames of a video file). Alternatively, the publisher can randomly select individual bits or data blocks (e.g., byte segments) to extract from random locations of the data stream 702 so that a predetermined percentage of data stream 702 is extracted to generate encoded data stream 708.

The publisher can also generate checksums 710 for encoded data stream 708, such that each checksum 710 corresponds to a segment 704 of encoded data stream 708. The publisher can send checksums 710 to a broker, either within an encoding sauce, or in addition to the encoding sauce. The broker can use checksums 710 to generate a checksum for each personalized data stream (or for a portion of the personalized data stream) that the broker generates for each client device that has valid access to receive data stream 702. Also, the publisher can generate the encoding sauce to include segments 706, along with instructions for re-inserting segments 706 into the personalized data stream, and instructions for generating and inserting one or more watermarks into the personalized data stream.

Figure 7B:
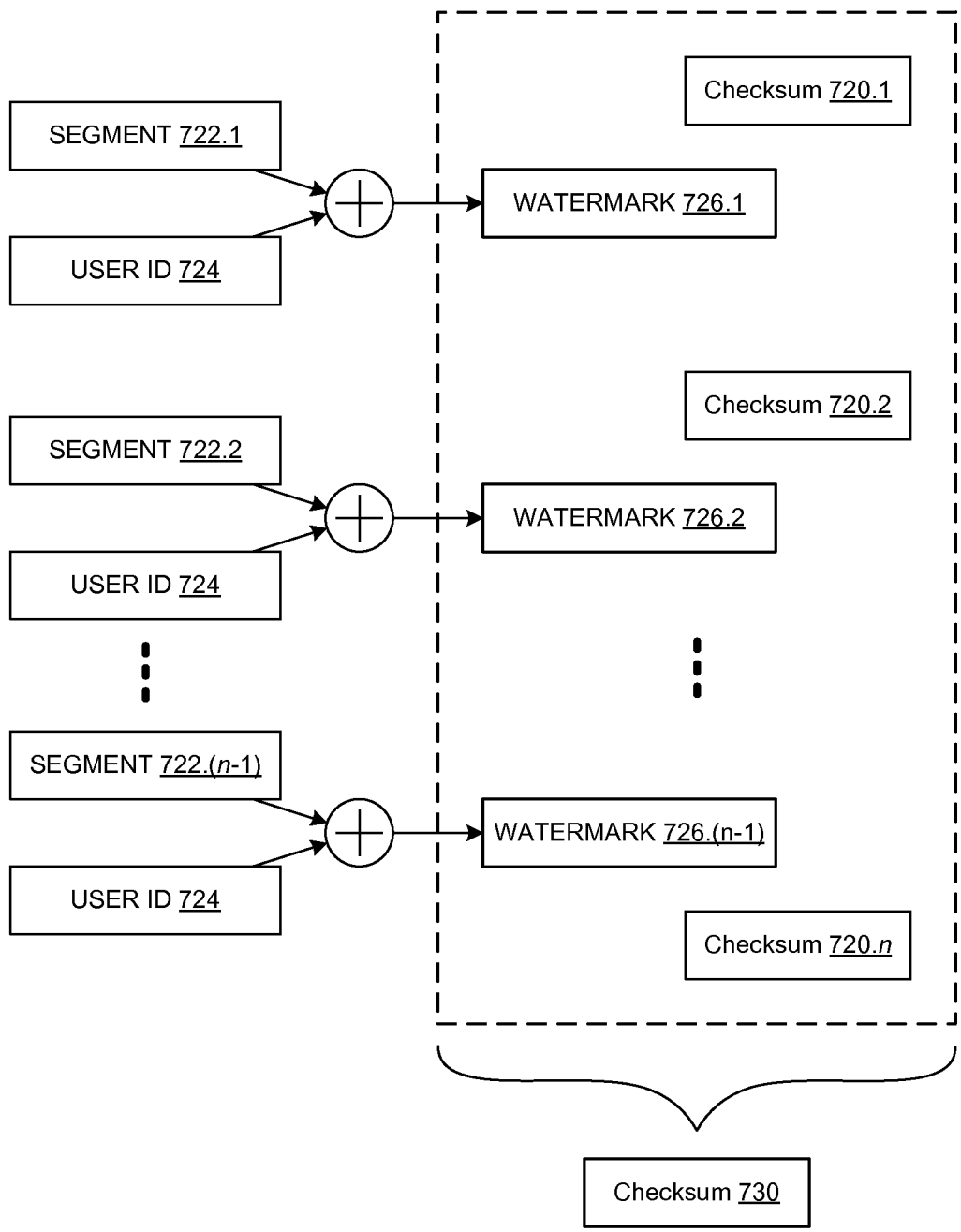
FIG. 7B illustrates a set of watermarks computed for a personalized data stream, and a checksum computed from multiple checksums and watermarks in accordance with an embodiment.

FIG. 7B illustrates a set of watermarks 726 computed for a personalized data stream, and a checksum 730 computed from multiple checksums 720 and watermarks 726 in accordance with an embodiment. Specifically, the broker can receive an encoding sauce that includes checksums 720 for segments of an encoded data stream, includes data segments 722 that have been extracted from a base data stream, and instructions for modifying segments 722 to generate a plurality of watermarks 726.

In some embodiments, the encoding sauce's instructions can indicate that the broker is to generate each watermark 726 by using a user ID 724 and a predetermined function to modify each data segment 722. For example, the broker can generate each watermark 726 by performing a bitwise operation (e.g., an exclusive OR (XOR) operation) between each data segment 722 and user ID 724, by performing an arithmetic operation, or performing any other operation now known or later developed. User ID 724 can indicate any unique identifier for a user that has requested access to the data stream, such as a unique numeric identifier, an account name or number, an email address, or any other identifier type now know or later developed.

Once the broker has generated the set of watermarks 726 that are to be inserted into a user's personalized data stream, the broker can compute a checksum for the personalized data stream itself. Recall that broker can receive checksums 720 from the publisher, such that checksums 720 correspond to the data segments in the encoded data stream. Hence, the broker can compute the checksum for the personalized data stream based on checksums 720, along with watermarks 726 that are to be inserted into the personalized data stream.

The broker then generates a secret sauce that includes watermarks 726, checksum 730, as well as the instructions from the publisher's encoding sauce that indicate how watermarks 726 are to be inserted into the personalized data stream.

Figure 7C:
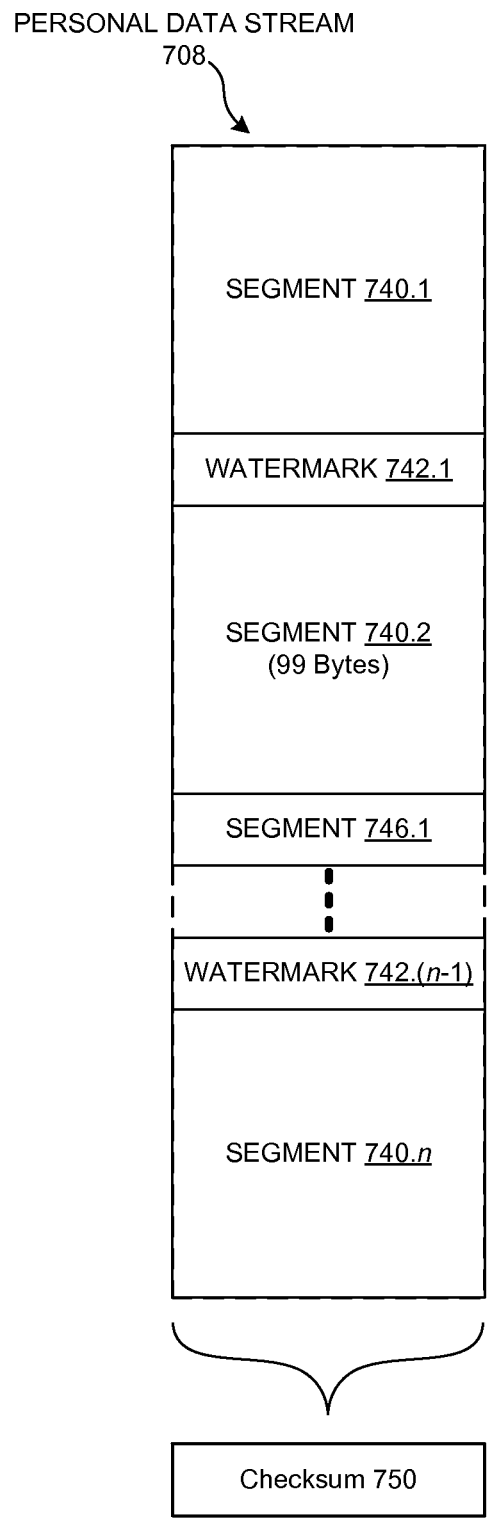
FIG. 7C illustrates a personalized data stream and a checksum computed from personalized data stream in accordance with an embodiment.

FIG. 7C illustrates a personalized data stream 740 and a checksum 750 computed from personalized data stream 740 in accordance with an embodiment. Specifically, a client device can receive an encoded data stream from a publisher (and/or from any ICN device which has cached the encoded data stream), and can receive a secret sauce stream from a broker for the data stream. The client device can obtain or compute watermarks 744 and data segments 746 from the secret sauce stream, and can use instructions in the secret sauce stream to generate personalized data stream 740 by inserting watermarks 744 and/or data segments 746 into specific sections of the encoded data stream. The client device can also compute checksum 750 for the personalized data stream, and can compare checksum 750 to a checksum in the secret sauce to verify the integrity of the personalized data stream.

Gathering Content-View Analytics

Figure 8:
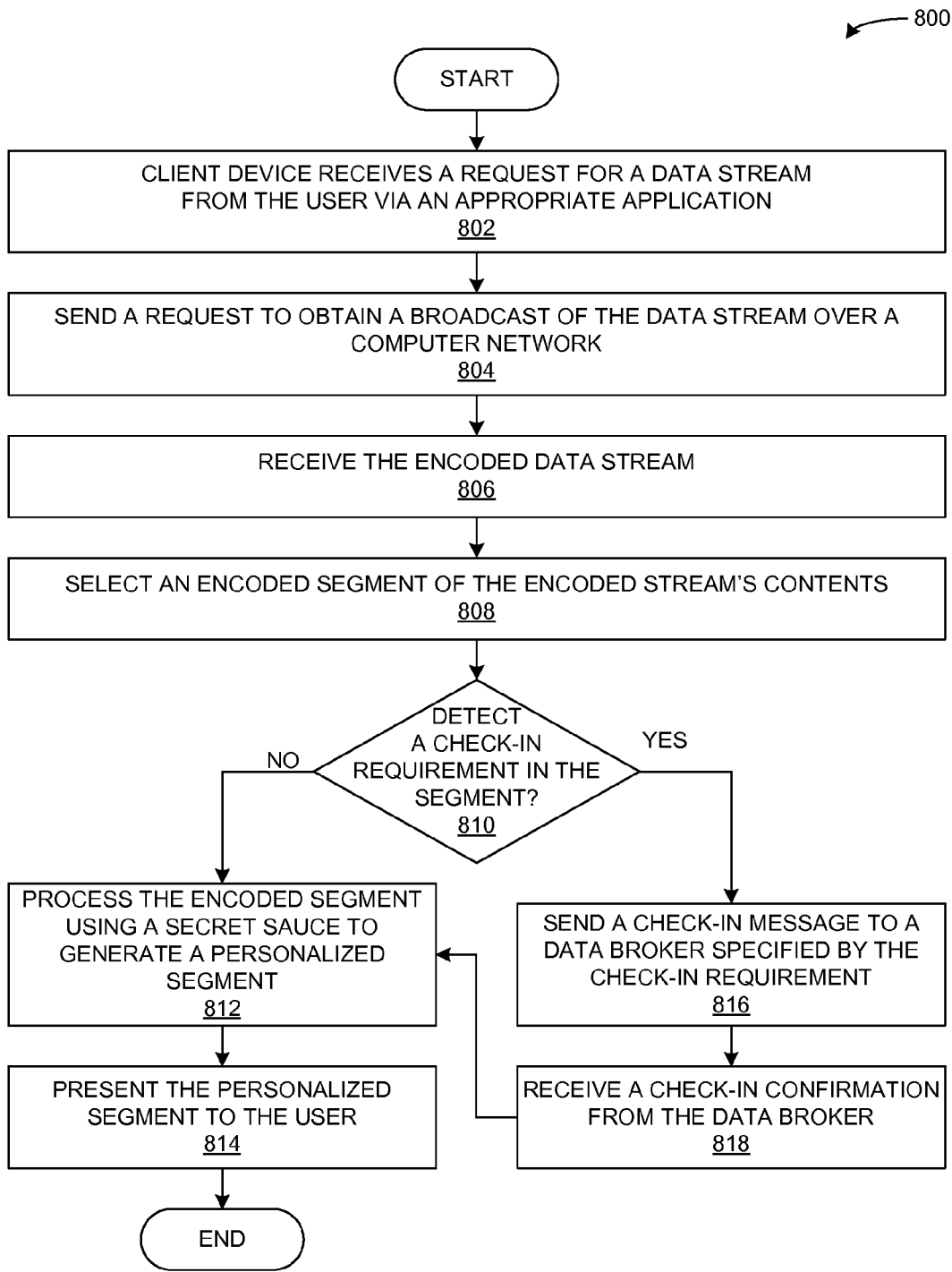
FIG. 8 presents a flow chart illustrating a method for presenting a data stream to a user, and providing demographic information to a broker in accordance with an embodiment.

In some embodiments, a broker can gather analytics information for viewers of digital content, and generates a report for a producer of the digital content. The analytics information can indicate, for example, how many times a piece of digital content has been viewed, viewership demographics, etc. FIG. 8 presents a flow chart illustrating a method 800 for presenting a data stream to a user, and providing demographic information to a broker in accordance with an embodiment. For example, the client device can receive a request for a data stream, from a user via an appropriate application on the user's device (operation 802). The client device sends a request to obtain a broadcast of the data stream over a computer network (operation 804), and receives the encoded data stream (operation 806).

In some embodiments, the data stream may include one or more data segments that can be processed separately. These segments can include segments of an audio or video stream, or can include a file or document in a data collection. The client device selects an encoded segment (operation 808), and determines whether it detects a check-in requirement in the encoded segment (operation 810). The check-in requirement may correspond to a broker that is gathering demographic information for client devices that are consuming content from the broker. Alternatively, the check-in requirement may correspond to a content publisher that desires to understand statistical demographics for consumers that are interested in the publisher's content.

If the encoded segment does not include a check-in requirement, the client device can proceed to process the encoded data stream using the secret sauce to generate a personalized data segment (operation 812), and presents the personalized data segment to the user as usual (operation 814). Otherwise, the client device generates a check-in message to a broker specified in the check-in requirement, and sends the check-in message to the broker (operation 816). The check-in message can include demographic information for the client device, a geographic location for the device, information on the content being consumed by the client device, and/or any operations performed on the content by the client device (e.g., pausing, fast forwarding, or rewinding an audio or video stream).

If the broker receives a valid check-in message, the broker can respond by providing a check-in confirmation to the client device. This check-in confirmation can include an acknowledgement that the broker received the client's check-in message. In some embodiments, the check-in confirmation can include a secret sauce that the client device can use to process the encoded segment. The encoded data segment by itself is unusable, so the client device processes the encoded data segment using the secret sauce to generate a usable data segment that the client device can present to the user. Once the client device receives the check-in confirmation from the data broker (operation 818), the client device can proceed to operation 812 to decode the encoded segment and present the personalized data segment to the user.

Alternatively, the client device may receive the check-in requirement directly from the broker, and not from the encoded data stream. For example, after the client device selects an encoded segment of the encoded stream's contents to process (operation 808), the client device can send a request for a secret sauce that allows the client device to decode the encoded segment. However, instead of sending the secret sauce to the client device, the broker can respond by sending a check-in requirement to the user's client device without sending the secret sauce. This check-in requirement requests that the client device provide personal information or demographic information about the user. After the client device receives the check-in requirement, the client device responds by sending the check-in message to the broker that includes the user's personal and/or demographic information. Then, after the broker receives and verifies the check-in message, the broker can respond by providing the secret sauce to the client device. The client device can then proceed to use the secret sauce to generate the personalized data stream (operation 812), and to present the personalized data stream to the user (operation 814).

Figure 9A:
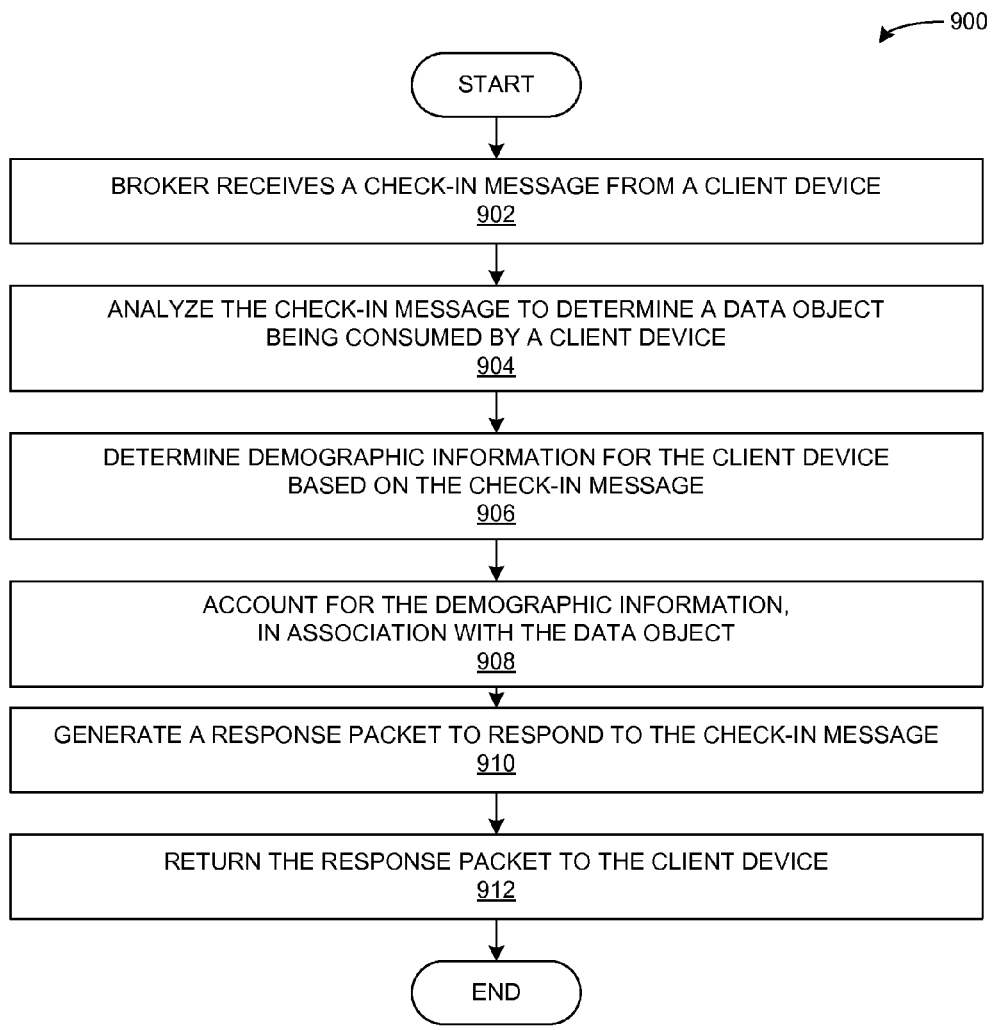
FIG. 9A presents a flow chart illustrating a method for keeping track of demographics for consumers of a data stream in accordance with an embodiment.

FIG. 9A presents a flow chart illustrating a method 900 for keeping track of demographics for consumers of a data stream in accordance with an embodiment. During operation, a broker can receive a check-in message from a client device that's consuming the digital content (operation 902). The broker analyzes the check-in message to determine a data object being consumed by a client device (operation 904), and to determine demographic information for the client device (operation 906). The demographic information can include, for example, an age, a sex, a location, an ethnic background, activities or items of interests, an employment status, a job role, career interests, or any other information that characterizes users that consume the digital content.

The broker then uses the demographic information to account for the demographic information in association with the data object (operation 908). For example, the system can update a collection of aggregated or statistical demographic information for the data object to account for the client device's demographic information, without explicitly storing the client device's demographic information. In some embodiments, the aggregated or statistical information can include a set of statistical attributes that each represents an aggregated value (e.g., a number of client devices that match the demographic attribute) or statistical value (e.g., a percentage of client devices that match the demographic attribute). These statistical attributes can each indicate a value for a given demographic-information category. Hence, while accounting for the client device's demographic information, the broker can first extract a set of attribute values from the demographic information, and can update the corresponding attribute values in the aggregated or statistical information to account for the client device.

The broker also generates a response packet, to respond to the client device's check-in message (operation 910, and returns the response packet to the client device (operation 912). In some embodiments, the client device may not be allowed to consume the digital content until the client device has "checked-in" to share its demographic information with the broker. Hence, the broker can generate the response packet to include a secret sauce that allows the client device to decode the data object, and generate a personalized data object that can be presented to a user.

Also, in some embodiments, the broker and the client device can communicate over a named-data network. The client device can generate an NDN packet that includes information to satisfy the check-in requirement. For example, the broker can request one or more client devices to check-in by generating an Interest packet that includes a name associated with the check-in requirement for a given data object. The broker can disseminate this Interest over the NDN to any client device that is consuming the data object. When the client device receives the Interest packet, the client device can generate and return a Content Object that includes the information to satisfy the check-in requirement.

As another example, a client-device can periodically check-in by pushing to the broker any information required to satisfy the check-in requirement. The client device can generate an Interest packet whose name includes a routable prefix that corresponds to the data object and/or a data-brokering service which monitors consumer demographics for the data object, and can include a suffix that includes one or more demographic-information attributes for the client device. The client device can disseminate this Interest packet over the NDN to check-into any data-brokering server that collects demographic information for the data object.

The Interest packet's name can also include a NONCE value to ensure that the Interest packet is forwarded to a server of the data-brokering service. The NONCE value prevents routers along the named-data network from returning a cached response to another check-in Interest packet. Also, the Interest packet's name can include a unique identifier that corresponds to the client device or its user session to ensure that an Interest packet is unique to each client device.

The broker can generate a Content Object packet that includes the response packet for the client device. The Content Object packet includes the same name as the Interest packet, which allows routers along the named-data network to forward the Content Object toward the client device that disseminated the Interest packet.

Figure 9B:
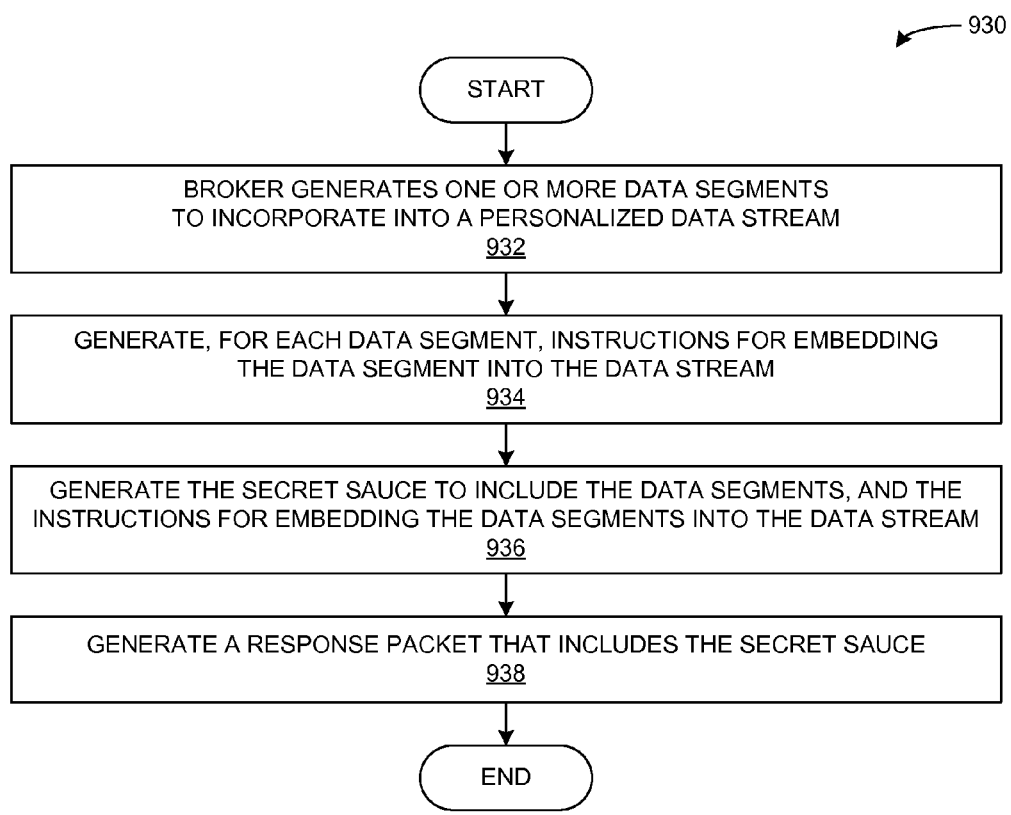
FIG. 9B presents a flow chart illustrating a method for generating a secret sauce for a user's client device in accordance with an embodiment.

FIG. 9B presents a flow chart illustrating a method 930 for generating a secret sauce for a user's client device in accordance with an embodiment. During operation, the broker can generate one or more data segments to incorporate into a personalized data stream (operation 932). A data segment can include, for example, one or more blocks of data that were extracted from an original data stream to produce an encoded data stream, or can include any user-targeted information to insert into a data stream. The user-targeted information can include a watermark with information that identifies the user or client device. As another example, the user-targeted information can include an advertisement, or any other digital content that is selected specifically for the user.

The broker then generates, for each data segment, instructions for embedding the data segment into the data stream (operation 934). These instructions can include, for example, instructions for inserting the data segment into the data stream, or for encoding the data segment into existing portions of the data stream. The broker then generates the secret sauce to include the data segments and the instructions (operation 936), and generates the response packet to include the secret sauce (operation 938).

In some embodiments, the broker can generate a report that includes statistical information for users, clients, and/or programs that consume a data stream. For example, as mentioned above, the broker can obtain aggregate information from the client devices by sending check-in requirements to these client devices. As another example, even if the broker does not issue check-in requirements (e.g., does not receive explicit check-in messages that specify demographic information from the client devices), the broker can automatically keep track of content-view statistics based on the requests received for the content's secret sauce. These content-view statistics can include, for example, a number of views for a given page (e.g., a web page, a document page, etc.), or for a given media segment (e.g., a portion of a video or audio file). The broker can compile the content-view statistics that include aggregated viewership for a plurality of client devices, and can provide a report that includes the content-view statistics to an advertiser, a publisher, or any entity that is authorized to obtain the report.

The content-view statistics can also include any aggregated statistical information that can be determined from a client device's request for the secret sauce, such as an Internet service provider, a network bandwidth, a geographic region, etc. If the user has established a profile with the broker, the broker can obtain a user identifier from the client device's request for the secret sauce, and can determine demographic information for the user based on the user's profile. The broker can aggregate this additional information from a plurality of client devices to generate statistical information about the users that are consuming the content, and can include this statistical information in the report.

Figure 9C:
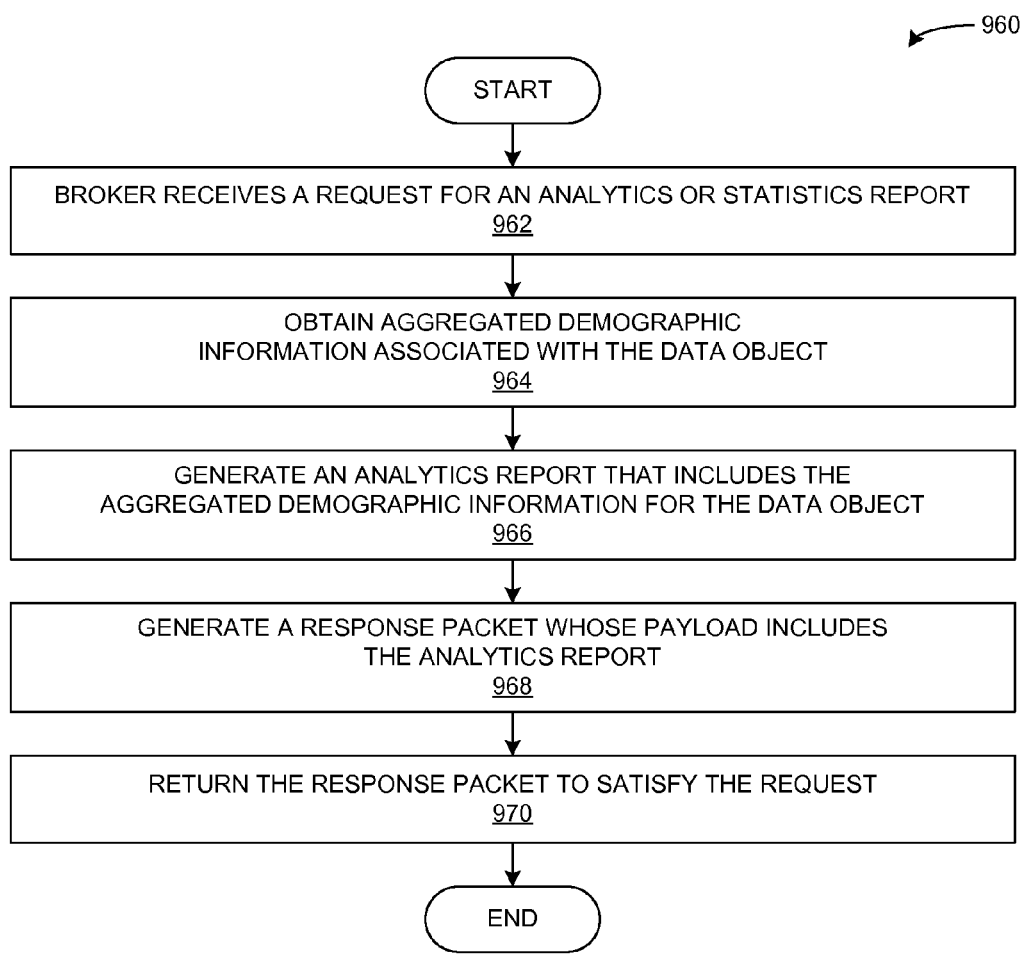
FIG. 9C presents a flow chart illustrating a method for processing a request for an analytics report in accordance with an embodiment.

FIG. 9C presents a flow chart illustrating a method 960 for processing a request for an analytics report in accordance with an embodiment. During operation, the broker can receive a request for an analytics or statistics report that indicates aggregated demographic information related to consumers of a certain data object or stream (operation 962). The broker can receive the request from an advertiser, a publisher, or from any entity that is interested (and authorized) to obtain the report. Upon receiving the request, the broker can verify that the entity is authorized to obtain the report (e.g., based on a digital certificate or any other secure identifier). The broker then obtains the aggregated demographic information associated with the data object (operation 964), and generates the analytics report that includes the aggregated demographic information (operation 966).

In some embodiments, the request can indicate parameters for the analytics report, such as a time window, a set of demographic-information categories of interest. The request can also specify values for one or more demographic-information categories to narrow down the scope for the analytics report, such as to learn about clients from a given geographic location (e.g., North America, or Europe) or with a given interest ("Sports" or "NFL"). In some embodiments, the broker may maintain an analytics repository that stores aggregated demographic information for a fine-grained time granularity, such as for one-minute time intervals. Doing so allows the broker to store meaningful user-demographic information that does not reveal an individual user's personal behavior data. Thus, the broker can obtain the aggregated demographic information for a given time window by compiling the aggregated information from a plurality of smaller time intervals.

Alternatively, the broker can store raw behavior information for a plurality of users in the analytics repository, which keeps track of the data objects and data streams consumed by each user or client device. The broker can use this raw behavior information to compile the aggregated demographic information for a given data object.

The broker then generates a response packet whose payload includes the analytics report (operation 968), and returns the response packet to satisfy the request (operation 970). In some embodiments, the broker and the remote device can communicate over a named-data network. The remote device can generate an Interest packet that includes the request for the analytics report, and can disseminate this Interest packet over the named-data network to obtain the report from any broker (or all brokers) that is keeping track of consumer demographics for the data object. Similarly, if a broker has designated sub-brokers, the broker can request and receive a report from all its sub-brokers. The broker then combines all the reports and can send this aggregated report as well as individual sub-reports to the publisher, advertiser, etc.

The Interest packet's name can include a routable prefix that corresponds to a data-brokering service, and can include a suffix that includes a NONCE value, a name for the data object, a desired time window, and/or any other parameters for the report. The NONCE value ensures that the Interest packet is forwarded to a server of the data-brokering service by preventing routers along the named-data network from returning a cached response to another check-in Interest packet.

The broker can generate a Content Object packet that includes the analytics report. The Content Object packet includes the same name as the Interest packet, which allows routers along the named-data network to forward the Content Object toward the remote device that requested the analytics report.

Marketplace for Buying and Selling Ad Slots

Figure 10:
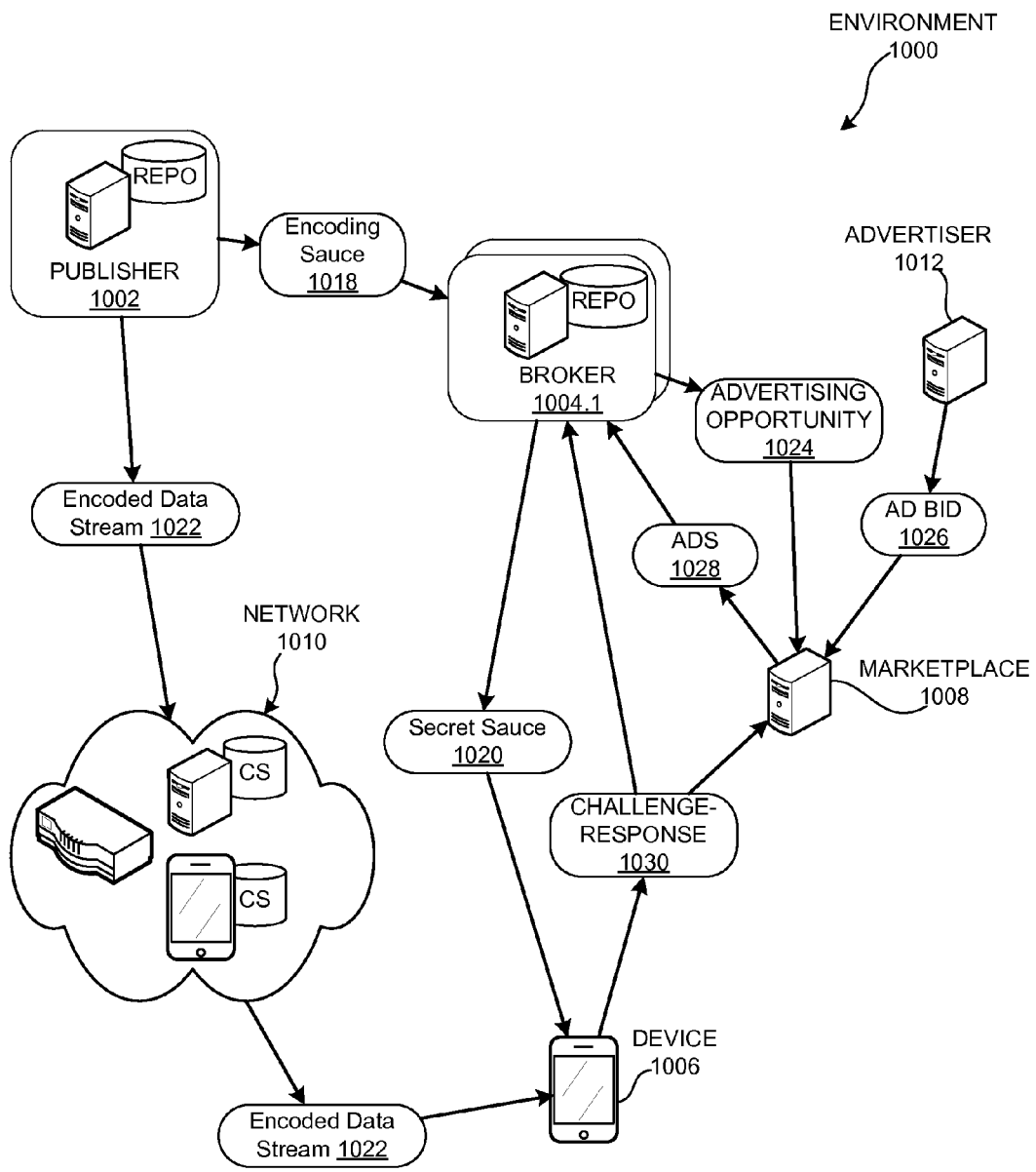
FIG. 10 illustrates an exemplary computing environment that facilitates placing advertisements in content streamed over an information-centric network in accordance with an embodiment.

FIG. 10 illustrates an exemplary computing environment 1000 that facilitates placing advertisements in content streamed over a peer-to-peer network 1010 or an information-centric network 1010 in accordance with an embodiment. Environment 1000 can include a publisher 1002 that publishes a data stream, and one or more brokers 1004 that control access to the data stream. Environment 1000 can also include an advertiser 1012 that purchases ad slots during broadcast of the data stream, and a marketplace 1008 that facilitates matching advertisements to ad slots. Specifically, marketplace 1008 can include a trusted third party to media brokers 1004 and advertiser 1012, and selects a bid by performing an auction. The auction can include a first-price sealed-bid (FPSB) auction, an English auction, a Dutch auction, a sealed-bid second-price auction, or any other auction type now known or later developed.

Publisher 1002 can include a computing device that disseminates an encoded data stream 1022 over network 1010. In some embodiments, a broker 1004.1 can control access to digital content from a publisher 1002 in a way that presents paid advertisements or personalized digital coupons to users that consume the digital content. This allows broker 1004.1 to present advertisements on behalf of publisher 1002, and to earn money for publisher 1002. For example, broker 1004.1 can receive an encoding sauce 1018, which broker 1004.1 uses generate a secret sauce 1020 for a client device 1006 that desires to decode an encoded data stream 1022 from publisher 1002, and that has proven to have consumed a sufficient number of paid advertisements.

Client device 1006 may obtain encoded data stream 1022 either from publisher 1002, or from any device in network 1010. However, encoded data stream 1022 is encoded in a way that prevents client device 1006 from presenting the data stream to a local user. To present the data stream, client device 1006 periodically requests a secret sauce 1020 from broker 1004.1 that client device 1006 uses to decode a segment of encoded data stream 1022 before presenting the segment to the user. However, broker 1004.1 can ensure that clients are presenting advertisements to users by only providing secret sauce 1020 to client device 1006 once client device 1006 has proven to have retrieved and processed a sufficient number of advertisements.

If the user is presented with a personalized digital coupon as an advertisement, the user can redeem the coupon to obtain a product or a service at a discounted price or for free. For example, the user can use a code printed on the coupon to redeem the coupon via a website or mobile application associated with the advertiser. Alternatively, the user can print the digital coupon, and can present the printed coupon at a brick-and-mortar venue associated with the advertiser.

Advertisers typically design an advertising campaign with certain goals in mind, such as a target time frame, a target geographic location, a target audience demographic, etc. Hence, they may create the advertisement with these goals in mind, and they look for advertising opportunities that can meet these goals. For example, a shaving cream advertisement that's directed to older men will have little effect when presented during a children's cartoon. Marketplace 1008 solves this problem by accepting an advertising opportunity from a set of brokers, and by accepting advertising requirements from a set of advertisers. Each advertising opportunity specifies one or more attributes describing the advertising opportunity. These attributes can include a time interval during which the media broker is to provide access to the media stream, information about a user demographic, and keywords for the digital content over which the advertisement is to be presented. An advertiser's advertising requirements can indicate information regarding a target user demographic for a given advertisement. Once marketplace 1008 selects a bid from an advertiser for an advertising opportunity, marketplace 1008 can establish a contract between the broker and the advertiser. Marketplace 1008 can terminate the contract once the advertising opportunity has expired or the advertising requirements have been satisfied.

In some embodiments, a broker 1004.1 can have a plurality of clients that typically use broker 1004.1 to consume digital content. These clients may either have a subscription with broker 1004.1, or broker 1004.1 may be a free service that allows any client device to consume ad-supported content. Broker 1004.1 can collect information from these clients to compile demographic information to publishers and/or advertisers that are partnered with (or planning to partner with) broker 1004.1. This collected information can include real-time behavior data (e.g., a user pausing, fast-forwarding, or rewinding a media stream), demographic information, and geographic location data. Broker 1004.1 can leverage its clients to sell advertising opportunities to advertisers via marketplace 1008, and discloses the typical client information to attract advertising bids.

Marketplace 1008 can establish a deal when broker 1004.1 proposes an advertising opportunity, and marketplace 1008 considers bids from a plurality of advertisers to select a winning bid (e.g., from advertiser 1012) whose requirements are a closest match to the advertising opportunity's description. Alternatively, marketplace 1008 can establish a deal when advertiser 1012 provides a description of an advertising campaign, and marketplace 1008 selects a broker that can best satisfy the advertising campaign's requirements. Marketplace 1008 can select a best-matching advertising opportunity for an advertiser's campaign based on an asking price set by a broker, consumer demographics specified by the broker, and/or content keywords associated with the advertising opportunity.

The price for placing an ad during the advertising opportunity can be set either by advertisers trying to place their advertisement during a broker's advertising opportunity (demand auction), by brokers trying to win an advertiser's campaign (supply auction), or via a double auction. In either case, the price is fixed once marketplace 1008 closes the deal. In some embodiments, marketplace 1008 can finalize the deal using an English auction, a Dutch auction, or using any auction type now known or later developed. Once the deal is finalized, marketplace 1008 receives a payment for the advertising campaign from advertiser 1012, and holds these funds in escrow until the advertising campaign is completed or the advertising opportunity ends.

Broker 1004.1 presents the advertisement to clients that consume digital content associated with the advertising opportunity, such as to client device 1006 consuming encoded data stream 1022 from publisher 1002. For example, if client device 1006 has not viewed enough advertisements to consume a segment of encoded data stream 1022, broker 1004.1 can send the advertisement (or a link to the advertisement) to client device 1006, along with a challenge that client device 1006 needs to complete to prove that client device 1006 has consumed the advertisement.

After presenting the advertisement, client device 1006 processes the challenge to produce a challenge-response 1030, and sends challenge-response 1030 to broker 1004.1 and/or marketplace 1008. Marketplace 1008 verifies that challenge-response 1030 is valid on behalf of advertiser 1012, and never discloses information about any specific client device to advertiser 1012.

Broker 1004.1 or marketplace 1008 can close the advertising opportunity once broker 1004.1 has dispatched a predetermined number of advertisements to client devices, and these client devices have returned valid challenge responses to broker 1004.1 and/or marketplace 1008. Also, if broker 1004.1 does not dispatch enough advertisements to close the advertising campaign by the time the advertising opportunity's time window ends, marketplace 1008 can cancel the advertising opportunity, and returns any remaining funds to advertiser 1012. In some embodiments, marketplace 1008 can keep track of reputations on brokers and advertisers, for example, by computing a score that indicates how well they deliver on the terms they promised to deliver. Marketplace 1008 can display a broker's reputation to advertisers, and can display an advertiser's reputation to brokers. Also, when matching advertisers and brokers, marketplace 1008 can give a higher priority to advertisers and/or brokers that have a better reputation.

Marketplace 1008 can also send a report to advertiser 1012, which indicates how well the advertisement placement matched the advertising campaigns initial goals. This report can include aggregated demographic information for client devices that consumed the advertisement, such as a number of client devices for each demographic-information category.

In some embodiments, marketplace 1008 and brokers 1004 facilitate providing targeted advertisements to clients of a satellite broadcast network. For example, client device 1006 can receive encoded data stream 1022 via a satellite broadcast, and can receive secret sauce 1020 via a network connection (e.g., a land-based computer network). A small number of advertisements can be streamed to client device 1006 via satellite, and can be cached locally by client device 1006. Then, broker 1004.1 can notify client device 1006 of which ads to play during which media streams (e.g., via the network connection).

For example, publisher 1002 can notify marketplace 1008 on content that is to be streamed to client devices in the near future or in the distant future, and can indicate a description of the advertising opportunity. Advertisers can buy ad slots for this content presentation ahead of time. When a deal is made, advertiser 1012 can provide the advertisement to the satellite system ahead of time (e.g., to publisher 1002) to allow the advertisement to be streamed to and cached by the client devices that are likely to watch the content. When client device 1006 views the broadcast of this content, broker 1004.1 can configure client device 1006 to present the cached copy of the advertisement to the local user during a commercial break.

Given that a publisher 1002 may sell ad slots during a future advertising opportunity, advertisers can get a better deal (e.g., a lower price) for ad slots during data streams that are to be broadcasted in the distant future (e.g., next month or next year) than for other ad slots in the nearer future (e.g., during the next few minutes or hours). Also, advertisers can get a better deal when purchasing ad slots for a movie or show that has not yet been created than for other movies or shows that have already been filmed and are scheduled to be streamed to client devices.

In some embodiments, publisher 1002 can use marketplace 1008 to create an advertising opportunity for digital content that has not yet been created. Publisher 1002 can use any existing description of the content to create the advertising opportunity, such as by using a script for a movie or show, and a cast listing for the movie or show. Advertisers that buy ad slots for based on the preliminary description can get a lower price, given the risk associated with possible changes to the script and/or cast. Other possible risks include the content not meeting the advertiser's expectations, the content may not appeal to their expected demographic, and/or the content (and advertisements) may not be viewed by the desired number of people.

The publisher's description of the advertising opportunity can indicate demographic information for the target audience, a content type for the digital content (e.g., TV show, movie, video, music, web page, news article, book, etc.), and a description of the content. The description can also indicate a progress timeline for the project, such as a current state of development, an expected presentation date, and/or a latest presentation date for the content.

If publisher 1002 has not yet raised the money necessary to create the digital content, publisher 1002 can use a report of enlisted advertisers to raise investor money to create the content. These advertisers have promised to place ads during the content, and have already placed funds in escrow. Investors may assign a higher valuation to a project that has attained significant interest from advertisers, as it indicates marketability of the digital content's overall concept.

Advertisers can safely purchase advertising slots from marketplace 1008 for content that has not been created, knowing that the advertiser's money is held in escrow by marketplace 1008 until the broker's advertising opportunity is completed or expires, and/or until the requirements from the advertisers advertising campaign are met. If publisher 1002 fails to create the digital content as promised, marketplace 1008 can return the advertiser's funds to the advertiser.

As was mentioned earlier, the digital content can include a web-page. Client device 1006 can include a web browser application that can obtain an encoded data stream 1022 for the web page, such that encoded data stream 1022 may be missing key information that allows the web browser to format the web page correctly. Alternatively, encoded data stream 1022 may include certain content from the web page in encrypted form. The web browser can display the web page to the user by first downloading and presenting advertisements from broker 1004.1 in the web page. Once client device 1006 has obtained and presented the advertisements, client device 1006 can generate and send a challenge response 1030 for these advertisements to broker 1004.1, thereby proving to the broker that client device 1006 consumed the ad. After broker 1004.1 validates challenge response 1030, broker 1004.1 can generates a secret sauce 1020 that includes the missing code that allows the web browser to display the web page properly, or includes a decryption key that allows client device 1006 to decrypt certain content that was encrypted in encoded data stream 1022. Broker 1004.1 then sends secret sauce 1020 to client device 1006 to allow client device 1006 to display the web page properly to the user. Alternatively, client device 1006 can send challenge response 1030 to marketplace 1008. Marketplace 1008 verifies challenge response 1030, and sends a confirmation to broker 1004.1 to send the secret-sauce 1020 to client device 1006.

Figure 11:
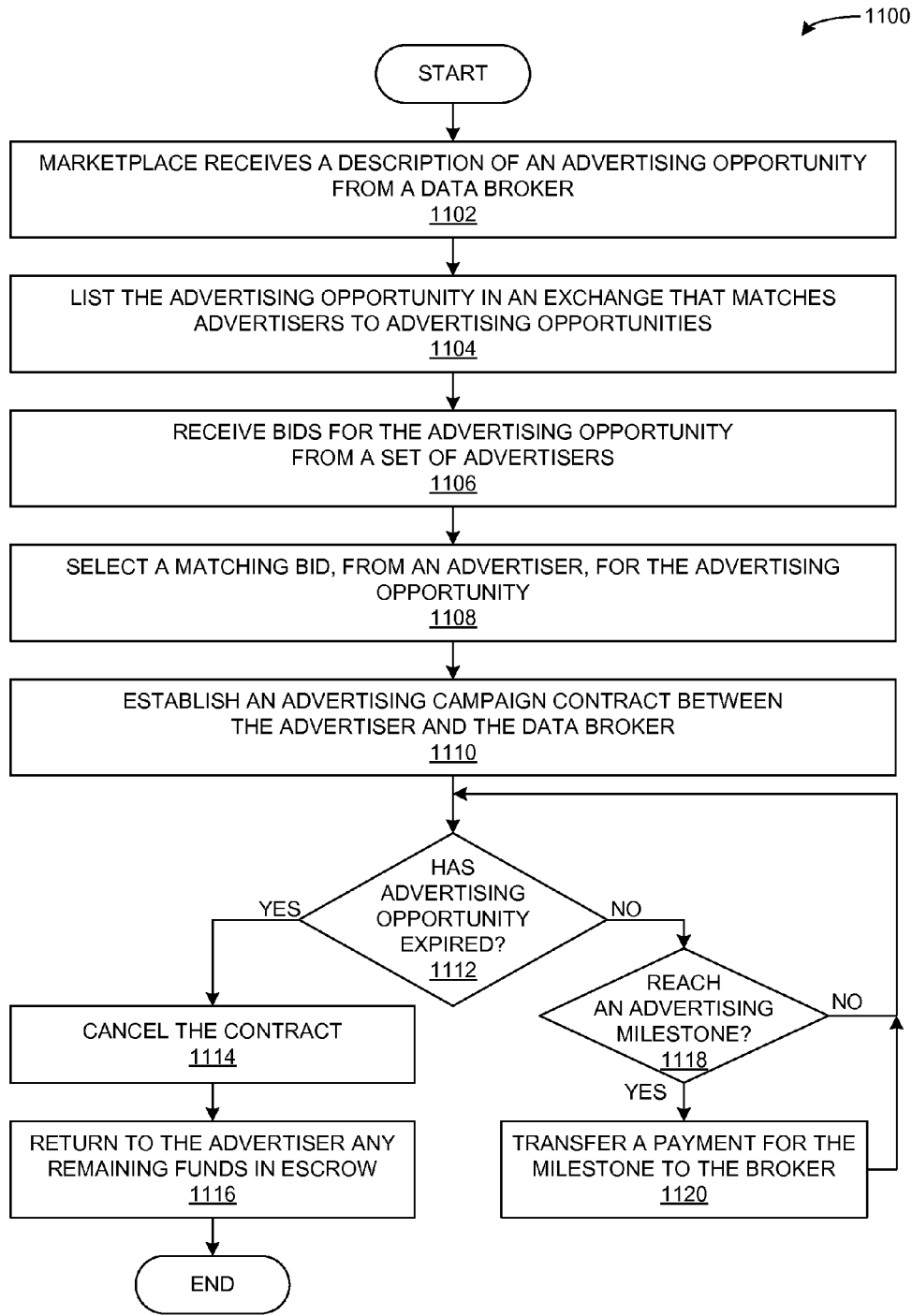
FIG. 11 presents a flow chart illustrating a method performed by a marketplace to match advertisers to a broker's advertising opportunity in accordance with an embodiment.

FIG. 11 presents a flow chart illustrating a method 1100 performed by a marketplace to match advertisers to a broker's advertising opportunity in accordance with an embodiment. During operation, the marketplace can receive a description of an advertising opportunity from a data broker (operation 1102), and lists the advertising opportunity in an exchange that matches advertisers to advertising opportunities (operation 1104). The advertising opportunity description can indicate a desired price range for the ad slot, demographic information for the expected audience, a type of content for the data stream (e.g., a movie, a show, a song, an article, etc.), and keywords for the data stream's contents. The advertising opportunity description can also correspond to a data stream that does not yet exist, and can indicate a current state of development (e.g., currently filming, in production, etc.), a time frame during which a data stream is to be made available to users, a proposed cast, and any other information related to the project.

The marketplace can receive bids for the advertising opportunity for a set of advertisers (operation 1106), and selects a matching bid for the advertising opportunity (operation 1108). The marketplace can select the matching bid from an advertiser by matching attributes between the broker's description of the advertising opportunity, and the advertiser's bid to purchase an ad slot.

The marketplace then establishes an advertising campaign contract between the advertiser and the data broker (operation 1110). While establishing the contract, the market place receives funds for the advertising campaign from the advertiser, and holds these funds in escrow until the advertiser satisfies a certain pre-specified milestone. A milestone may include showing a single advertisement to a user, a showing a predetermined number of advertisements to users, or any other milestones agreed upon by the advertiser and the broker. For example, the advertiser may require that these milestones are achieved on a given set of demographic-information categories (e.g., for clients from North America) in order to be counted.

During the advertising campaign, the marketplace can make a payment to the broker each time the broker achieves a milestone during the advertising opportunity. For example, the marketplace can determine whether the advertising opportunity has expired (operation 1112). If so, the marketplace cancels the contract (operation 1114), and returns any remaining funds in escrow to the advertiser (operation 1116).

However, if the advertising opportunity has not expired (e.g., the data stream is still made accessible to users), the marketplace determines whether the broker has reached an advertising milestone (operation 1118). If the broker has reached a milestone, the marketplace transfers a payment for the milestone to the broker (operation 1120). Also, in some embodiments, the marketplace can retain a percentage of the payment as a service fee, either from the payment itself, or from the advertiser's funds in escrow.

In some embodiments, the marketplace can re-evaluate the advertising opportunity after a predetermined time interval, or in response to an event (e.g., in response to the broker presenting an advertisement to a user). For example, if the marketplace determines that a new milestone has not been reached during operation 1118, the marketplace can return to operation 1112 to re-evaluate the advertising opportunity.

Figure 12:
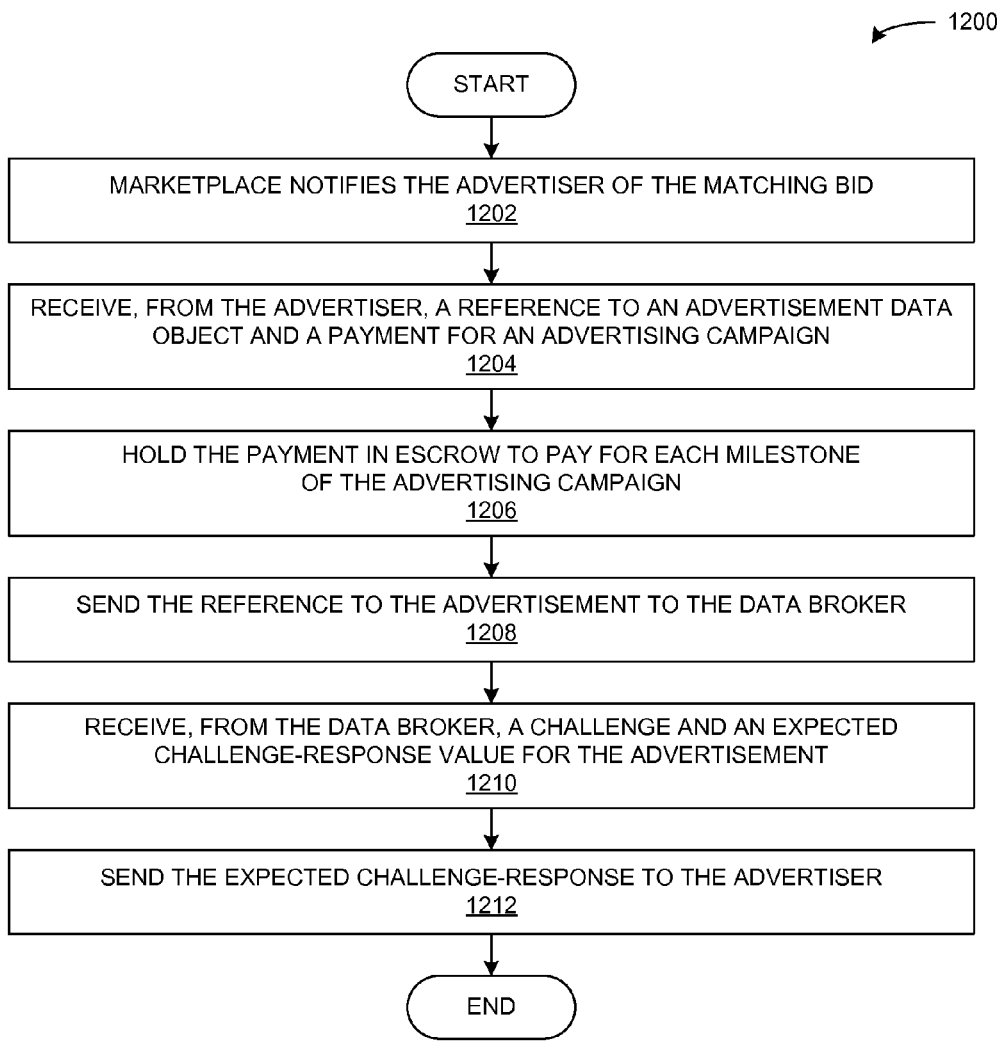
FIG. 12 presents a flow chart illustrating a method performed by a marketplace to establish an advertising campaign between an advertiser and a data broker in accordance with an embodiment.

FIG. 12 presents a flow chart illustrating a method 1200 performed by a marketplace to establish an advertising campaign between an advertiser and a data broker in accordance with an embodiment. During operation, the marketplace notifies an advertiser of the matching bid (operation 1202), and receives, from the advertiser, a reference to an advertisement data object and a payment for the advertising campaign (operation 1204). The advertisement's data object can include any data that presents an advertisement to a user, such as a video or audio clip, a picture, text, or executable instructions.

The marketplace then holds the payment in escrow to pay for each milestone of the advertising campaign (operation 1206), and sends the advertisement's reference to the data broker (operation 1208). After receiving the reference to the advertisement, the data broker generates a challenge for consumers of the advertisement, and generates an expected challenge response to the advertisement. The challenge can include, for example, instructions that cause a client device to obtain an $n^{th}$ byte in the advertisement object. The client device can execute the challenge's instructions to extract the $n^{th}$ byte from the advertisement, and to generate a challenge-response packet that includes the extracted $n^{th}$ byte.

The marketplace then receives the challenge and the expected challenge-response value from the data broker (operation 1210). The data broker enters into a contract to fulfill the advertising campaign by sending the challenge response and expected values to the marketplace. In some embodiments, the broker can compile a report that has challenge responses from a number of clients, and send this report or a summary of this report to the marketplace. The marketplace can send a confirmation message to the advertiser stating that the advertising campaign has been established, and can send the expected challenge response value to the advertiser in the confirmation message (operation 1212).

In some embodiments, the marketplace can receive challenge response values from the client devices directly, which the marketplace can use to verify that the broker is indeed providing the data stream and advertisements to client devices. In addition, the marketplace can compute content-view statistics based on the challenge response messages received from the client devices, and can compile the content-view statistics into a report to send to a publisher, advertiser, producer, etc. In some cases, the publisher or advertiser can request these statistics reports both from marketplace and the brokers, and can compare the reports from the brokers and the marketplace to ensure the reports match.

The content-view statistics can include, for example, a number of views for a given page (e.g., a web page, a document page, etc.) or for a given media segment (e.g., a portion of a video or audio file, or the complete file), or a number of advertisements presented for a given data stream (e.g., ads shown per streaming session, or total number of ads shown across all users). The content-view statistics can also include any aggregated statistical information that can be determined from a client device's request for the secret sauce, such as an Internet service provider, a network bandwidth, a geographic region, etc. If the user has established a profile with the broker, the broker can obtain a user identifier from the client device's request for the secret sauce, and can determine demographic information for the user based on the user's profile. The broker can use profile information from a set of users that have viewed the data stream to generate aggregated demographic information for the data stream, and can include this aggregated demographic information in the report.

Figure 13:
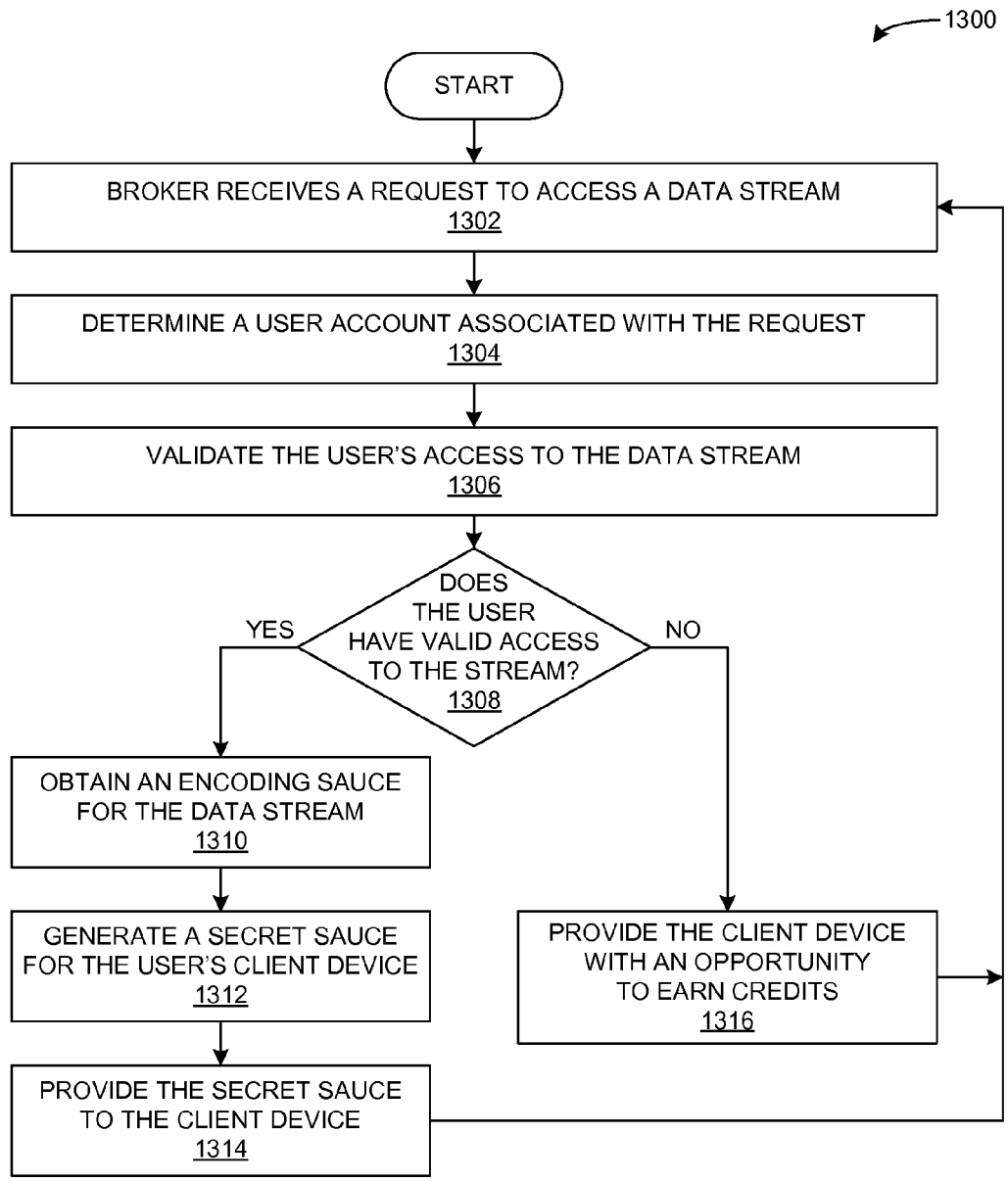
FIG. 13 presents a flow chart illustrating a method performed by a broker to process a client's request for access to a data stream in accordance with an embodiment.

FIG. 13 presents a flow chart illustrating a method 1300 performed by a broker to process a client's request for access to a data stream in accordance with an embodiment. During operation, the broker can receive a request from a user's client device for accessing a data stream (operation 1302). The request can include an Interest for a secret sauce stream that corresponds to a portion of an encoded data stream, and can include the client device's public key. The client device and broker device can also exchange transaction messages, for example, to validate the client device's authentication information for a pre-paid media stream, to pay for a pay-per-view style media stream, to transfer an advertisement token to the broker device, etc.

An advertisement token can include a data object that proves a client device has viewed an advertisement, and either indicates a value (e.g., a fixed number of credits) or has an inherent value (e.g., worth a number of credits as determined based on market supply and demand). For example, when a user's client device presents an advertisement to a user, the client device can process a challenge (received from the broker) to compute a challenge response based on the advertisement. The client device can create a token using the challenge response, and signs the token using the client's private key. A broker can analyze tokens from the client device to determine a number of credits owned by the client device. The broker can accept tokens from the client device as payment to consume a data stream, or can display advertisements to the client device to allow the client to generate new tokens.

The broker then determines a user account associated with the request (operation 1304), and validates the user's access to the data stream (operation 1306). The user can have valid access to the data stream when the user has purchased a movie, subscribed to a video streaming service, or when the user has purchased or subscribed to any other digital content (e.g., subscribing to a news website, purchasing a software application, etc.). Alternatively, if the user has not purchased or subscribed to the data stream, the user may access the data stream if the user has acquired a sufficient number of necessary credits. The user can earn the necessary number of credits by viewing one or more commercials or advertisements.

The broker then determines whether the user has valid access to the data stream (operation 1308). If so, the broker can obtain an encoding sauce that corresponds to the encoded data stream, either from a local repository or from the publisher (operation 1310). The broker uses the encoding sauce to generate a secret sauce for the user's client device (operation 1312), and provides the secret sauce to the user's client device (operation 1314). The client device can use this secret sauce to process the encoded data stream to generate a personalized data stream. In some embodiments, the broker does not need to generate a unique secret sauce from the encoding sauce. For example, some encoded data streams might not need a secret sauce to decode the stream. Hence, the broker can forward the encoding sauce to a client device during operation 1314, which allows the client device to process the encoded data stream to reproduce the original data stream (whose contents are not personalized for the client device).

In some embodiments, if the user does not have valid access to the data stream, the broker can provide the client device with an opportunity to earn credits (operation 1316). For example, if the data stream needs to be purchased or rented, the broker can provide the user with a user interface that allows the user to pay for the data stream's contents. Once the user has paid, the broker issues to the user a necessary number of credits for viewing the data stream. If the data stream requires a subscription to a streaming service, such as a movie or music streaming service, the broker can provide the user with an option to log into the streaming service as a way to validate that the user is a subscribed member. Alternatively, the broker can present the user with an interface for subscribing to the streaming service.

In some embodiments, the user can earn credits to access the data stream by viewing advertisements, such as by viewing a media stream that presents a commercial to the user. When the user's client device presents an advertisement to a user, the client device can process a challenge (received from the broker) to compute a challenge response based on the advertisement. The client device can create a new token for the user using the challenge response, and signs the token using the client's private key. An advertisement token can either indicate a value (e.g., a fixed number of credits) or can have an inherent value (e.g., worth a number of credits as determined based on market supply and demand).

Each advertiser can bid to display advertisements to the user, and a portion of the payment for the advertisement can be used to purchase advertising tokens for the user. This way, an advertiser can pay to purchase more tokens for a client as a way to reduce the number of other advertisers with which it needs to share a given commercial break. When the user views the advertisement, the user's client device can process the challenge to generate a number of tokens paid for by the advertiser. The user is more likely to remember the advertisement if the user did not need to view additional advertisements before being allowed to continue viewing a movie or listening to music.

Hence, during operation 1308, the broker can analyze advertising tokens from the client device to determine whether the user possesses a sufficient number of credits to gain access to a portion of an encoded data stream. If so, the broker can proceed through operations 1310-1314 to provide the user's client device with a secret sauce that allows the client device to decode the next segment of the encoded data stream. After providing the secret sauce to the client device, the broker can return to operation 1302 to process a request for another segment of the data stream.

However, if the user does not own a sufficient number of tokens, the broker can provide a set of advertisements to the user that together provide the user with an opportunity to generate the necessary number of advertising tokens. Also, after presenting these advertisements to the user and sending the generated tokens to the broker, the user's client device can send another request to the data broker to attempt in accessing the data stream once again. Hence, the broker can return to operation 1302 to process the client device's request.

Figure 14:
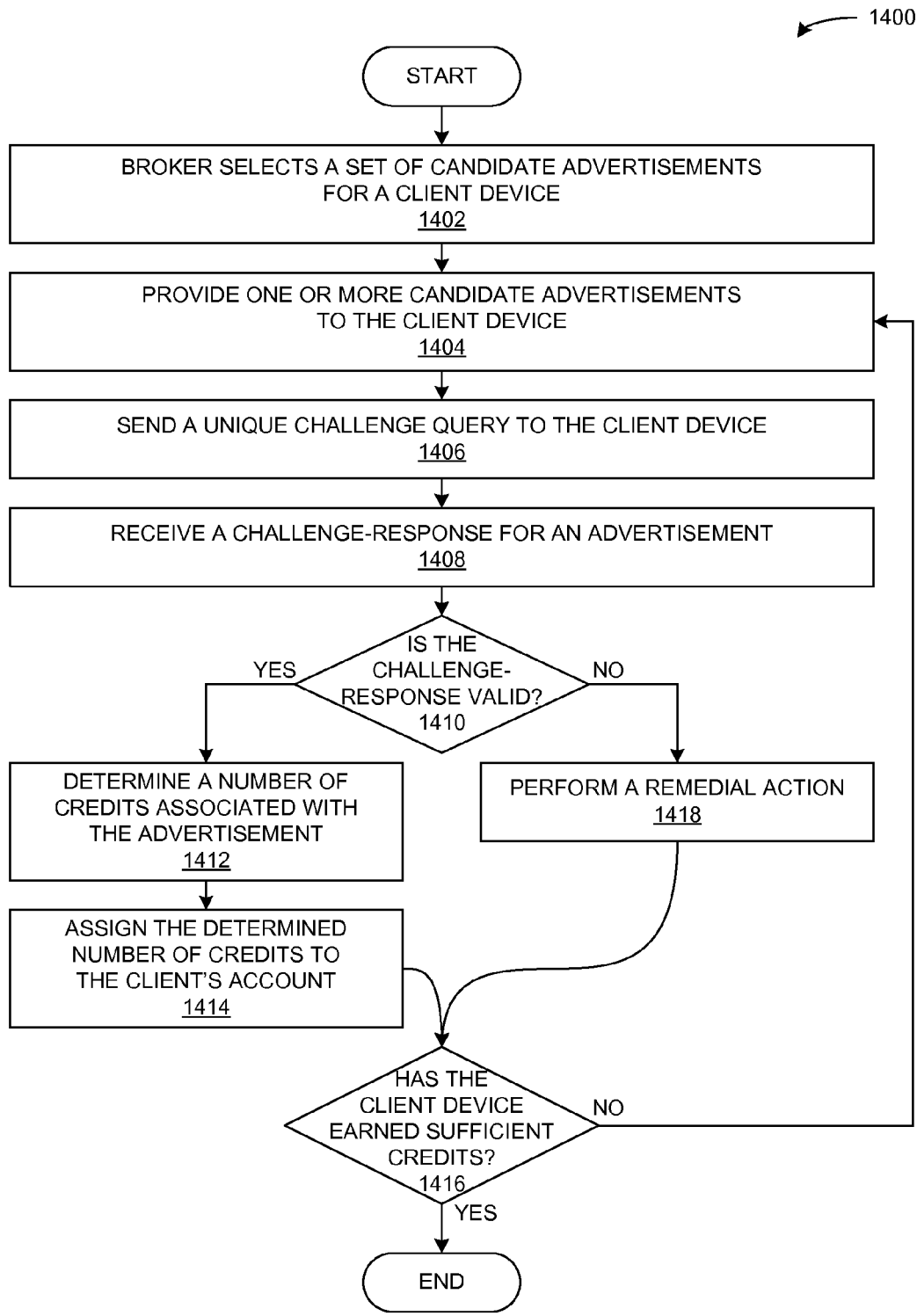
FIG. 14 presents a flow chart illustrating a method performed by a broker to provide a client device an opportunity to generate advertisement tokens in accordance with an embodiment.

FIG. 14 presents a flow chart illustrating a method 1400 performed by a broker to provide a client device an opportunity to generate advertisement tokens in accordance with an embodiment. During operation, the broker can select a set of candidate advertisements for a client device (operation 1402), and provides one or more candidate advertisements to the client device (operation 1404). In some embodiments, to send an advertisement to the client device, the broker sends a link to the advertisement, without sending the actual advertisement itself. The broker also sends a unique challenge query to the client device (operation 1406). The unique challenge query is specific to a given advertising opportunity, and the broker can generate the unique challenge query to include a set of instructions that are to be executed by the client device to generate a challenge-response that proves the client device has consumed the advertisement during the advertising opportunity. This forces a client device to compute a new challenge response for an advertisement, even if the client device has previously presented the advertisement to the user. This way, client devices cannot attempt to gain access to a media stream without presenting the advertisement to the user, for example, by returning a challenge response that the local device or a remote device generated for a previous showing of the same advertisement.

The broker can receive a challenge-response for an advertisement from the client device (operation 1408), and determines whether the challenge-response is valid (operation 1410). For example, the broker or the marketplace can obtain a token generated by a user's client device, verifies that the token is signed using the client's private key, decrypts or decodes the token to obtain a challenge-response message, and verifies that this challenge-response message is valid. In some embodiments, the broker can send the challenge-response message to the marketplace after the broker obtains the challenge-response message from the client device's token.

If the challenge-response message is valid, the broker determines a number of credits associated with the token or the advertisement (operation 1412), and can assign these credits to the client device (operation 1414). In some embodiments, the broker receives a public key from the client device along with the challenge-response. If the client device has earned a sufficient number of credits, the broker can use the client's public key to generate a secret sauce that the client device can use to decode an encoded data stream.

On the other hand, if the challenge-response from the client device is not valid, the broker can perform a remedial action (operation 1418). For example, the broker can log information regarding the client device to compile a report of possible fraudulent activity. After processing the challenge-response, the broker can determine whether the client has earned a sufficient number of credits (e.g., owns a sufficient number of tokens) (operation 1416). If so, the broker can proceed to allow the client device to access a data stream. However, if the client device does not own a sufficient number of credits, the broker can return to operation 1404 to provide more advertisements to the client device.

In some embodiments, during operation 1402, the broker can use a set of labels to select advertisements for the client device. For example, an advertisement stream can be associated with one or more tags. Each tag can include a combination of one or more labels that describe the particular advertisement stream. The broker can include a global tag repository that can contain a plurality of Tag Objects, such that each Tag Object corresponds to a defined tag.

Each Tag Object includes references to a list of advertisement streams that are associated with the tag that the Tag Object represents. An advertiser can add an advertisement stream to the Tag Object by contacting the Tag Object owner (e.g., the broker), who adds the advertisement stream's name to the Tag Object in the global tag repository. This effectively adds the tag to the advertisement stream.

The broker can use the Tag Objects to search through a collection of advertisement streams to select a set of candidate advertisement streams to provide to a user's client device. For example, the broker can obtain Tag Objects that correspond to a set of tags of interest, such as tags that describe the user's demographics, and/or a movie being consumed by the user. The broker then produces a set of advertisement stream names from the intersection of the set of Tag Objects (barring any null set).

For example, the broker may need advertising streams that are tagged "Cars," "Palo Alto," and "Red." The global tag repository may contain several Tag Objects corresponding to "Cars," and another corresponding to "Palo Alto." However, the global tag repository may not contain any Tag Objects corresponding to "Red." Furthermore, a car dealer "Mike's Fast Cars" may have submitted an advertising stream that it has associated with the Tag Objects "Cars" and "Palo Alto." The broker can perform a search to obtain the Tag Objects "Cars," "Palo Alto," and "Red." However, the search results may only return Tag objects for "Cars" and "Palo Alto," as the "Red" Tag Object doesn't exist. The broker then computes the intersection of stream names from the non-null Tag Objects, which produces a set of advertising stream names that include "Mike's Fast Cars" as a candidate advertisement. The broker then provides the set of advertising stream names to the client device.

Figure 15:
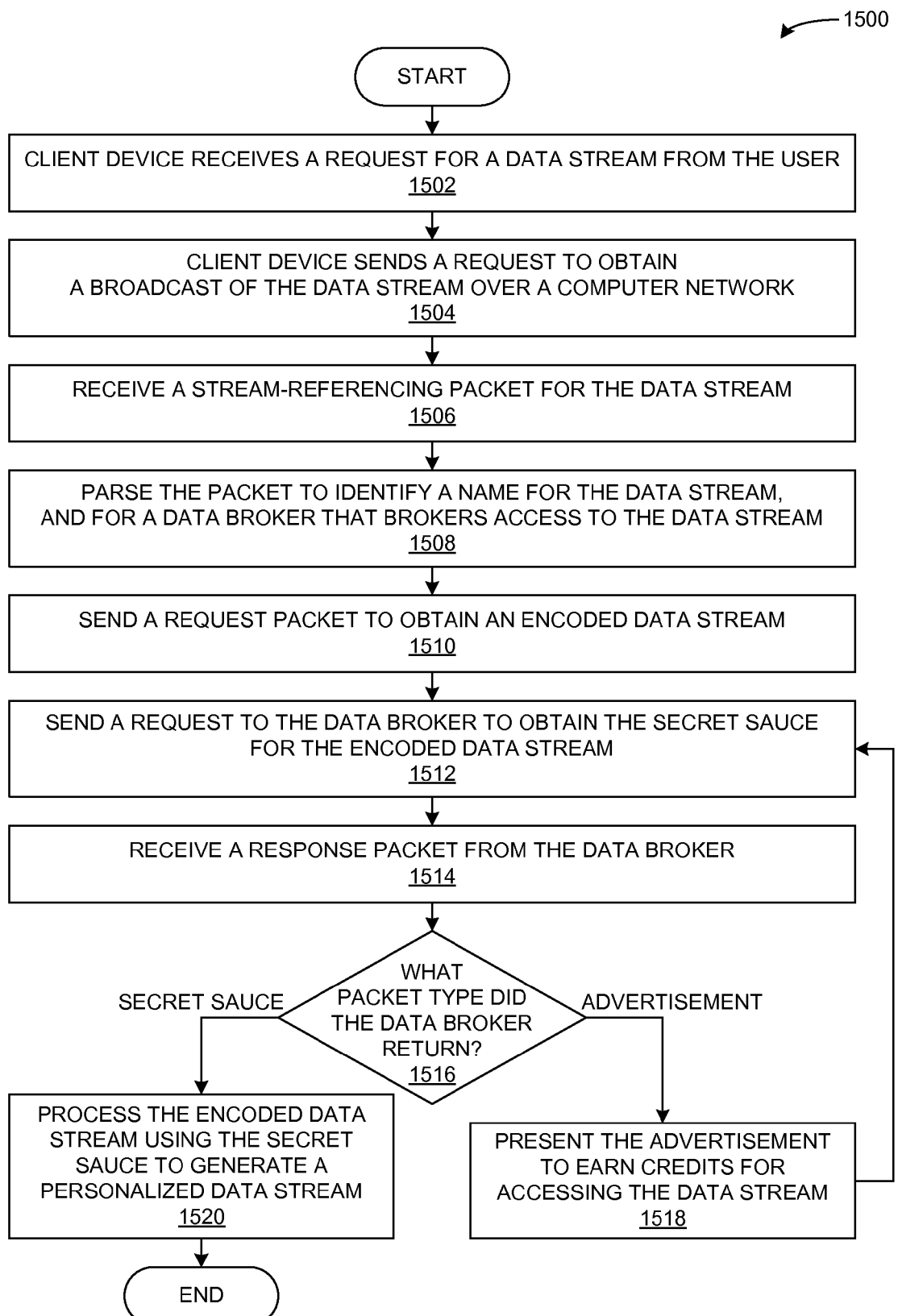
FIG. 15 presents a flow chart illustrating a method performed by a client device to generate a personalized data stream for a local user in accordance with an embodiment.

FIG. 15 presents a flow chart illustrating a method 1500 performed by a client device to generate a personalized data stream for a local user in accordance with an embodiment. During operation, the client device can receive a request for a data stream from the user (operation 1502), such as from a client application that is to present or provide the data stream to the user. The client device then sends a network request to obtain a broadcast of the data stream over a computer network (operation 1504). In some embodiments, the request can include an Interest message that indicates a name for the data stream, and can be disseminated over a named-data network. The client device then receives a stream-referencing packet for the data stream (operation 1506).

The stream-referencing packet can indicate a link (e.g., URL) or name (e.g., an NDN name) for downloading the encoded data stream over an information-centric network or over a peer-to-peer computer network, as well as a link or name for downloading or obtaining the secret sauce from the broker. In some other embodiments, the data stream may be broken down into a plurality of packets, and the stream-referencing packet can include an initial packet of the data stream. The stream-referencing packet can include a header that indicates links or names for one or more brokers.

The client device parses the stream-referencing packet to identify a link or name for the data stream, and to identify a link or name for a data broker that brokers access to the data stream (operation 1508). The client device sends a request packet to obtain an encoded data stream (operation 1510), and sends another request to the data broker to obtain a secret sauce stream for the data stream (operation 1512). The client device then receives a response packet from the broker (operation 1514), and analyzes the response packet to determine the packet type (operation 1516). If the response packet includes an advertisement (or a reference to an advertisement) to present to the user, the client device can present the advertisement to earn credits (generate tokens) that can be used to access the data stream (operation 1518).

On the other hand, if the response packet includes a secret sauce, the client device processes the encoded data stream using the secret sauce stream to generate a personalized data stream for the local user (operation 1520). For example, the client device can process the encoded data stream by inserting watermarks from the secret sauce stream into locations of the encoded data stream indicated by the secret sauce stream. Alternatively, the secret sauce stream can include instructions for generating the watermark, which the client device uses to generate one or more watermarking data segments that are inserted into the encoded data stream. These watermark-generating instructions may indicate operations for encoding a unique identifier of a local user into data segments provided in the secret sauce stream, or into data segments of the encoded data stream.

The client device can also execute any other instructions from the secret sauce, such as to perform analytics-related computations, or to present an advertisement. In some embodiments, the advertisement-presenting instructions can configure the client device to embed or overlay an image or media segment into a media stream. For example, a movie may include an image of a soda bottle with a label. The label in the original media stream may be for a generic brand, or for a brand that paid for product placement into the movie while the movie was being presented at movie theaters. However, once the movie enters the video-rental market, other advertisers may pay to have their brand's label overlaid into the movie for a pre-negotiated number of times, and/or for a predetermined audience demographic. Hence, the instructions from the secret sauce can configure the client device to overlay an image or a media segment over one or more frames of the media stream to generate a personalized media stream, so that the second brand's label is displayed on top of the bottle's initial label in the personalized media stream. These instructions can indicate an image and frame coordinate for each frame of the media stream, which the client device uses to overlay these images onto the media stream so that the brand's label can shift and animate along with the bottle. These instructions can also replace or overlay audio segments within the media stream, for example, to replace a verbal mention of one brand with the verbal mention of the second brand that is to be advertised to the local user.

In some embodiments, the client device can generate the personalized data stream in near real-time while presenting the media stream to the user. For example, the client device can receive the media stream as a sequence of stream segments, and receives a secret sauce stream that includes a secret sauce segment for each media stream segment. This way, the client device can process a media segment using a corresponding secret sauce segment to generate a personalized version of the media segment for the user, while receiving other media segments and secret sauce segments for the remainder of the media stream.

Figure 16:
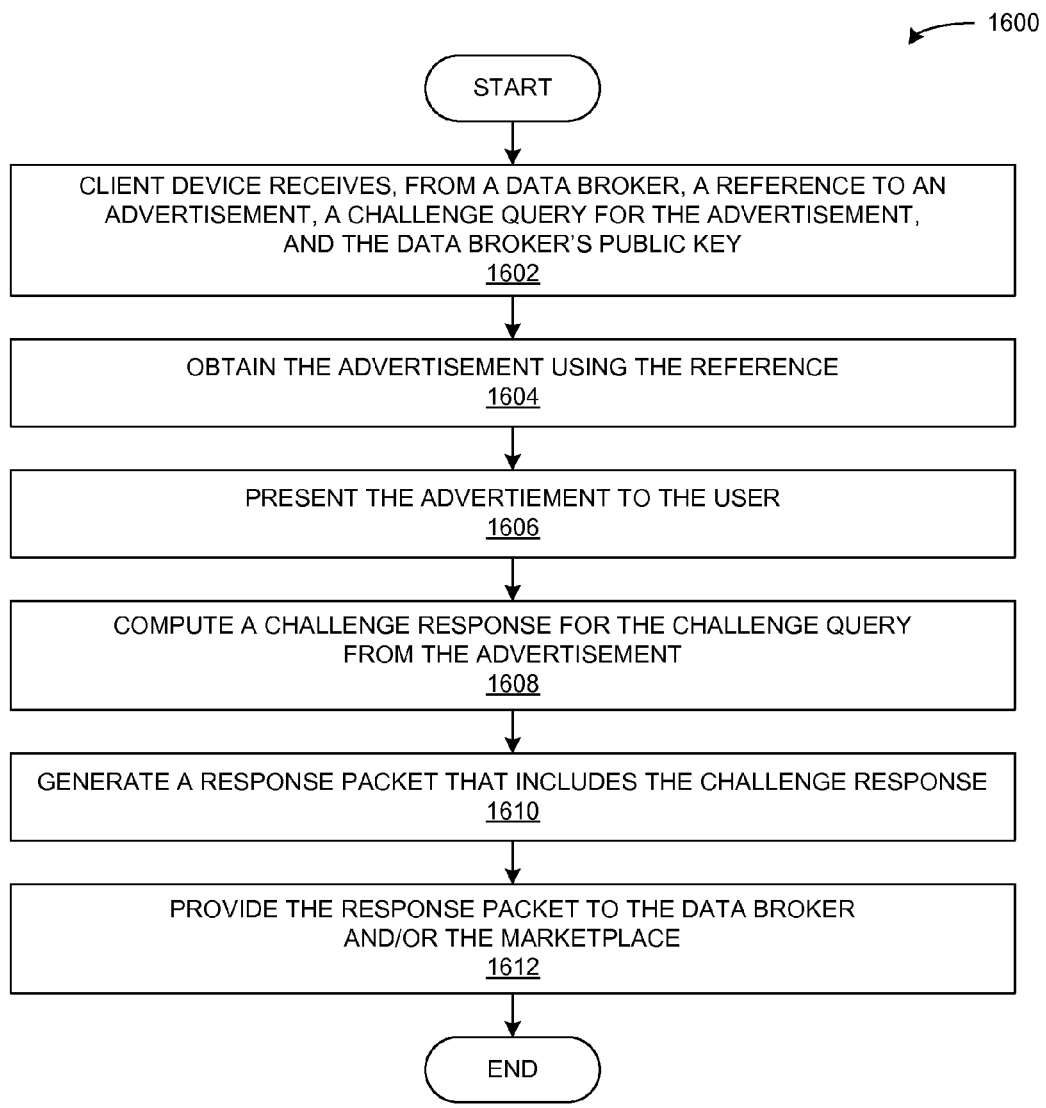
FIG. 16 presents a flow chart illustrating a method performed by a client device to present an advertisement to a local user in accordance with an embodiment.

FIG. 16 presents a flow chart illustrating a method 1600 performed by a client device to present an advertisement to a local user in accordance with an embodiment. During operation, the client device can receive, from the data broker, a reference to an advertisement, a challenge query for the advertisement, and the data broker's public key (operation 1602). The client device uses the reference to obtain the advertisement (operation 1604). For example, the reference may include a link (e.g., URL) that the client device uses to download the advertisement. Alternatively, the reference can include a name (e.g., an NDN name) that the client device uses to obtain the encoded data stream over an information-centric network or over a peer-to-peer computer network.

The client device then presents the advertisement to the user (operation 1606), and computes a challenge response for the challenge query from the advertisement (operation 1608). The challenge can include instructions that require the client device to process the advertisement in a way that produces a result that proves the client device has obtained and played back the advertisement. For example, the challenge can include instructions that cause the client device to obtain an $n^{th}$ byte from the advertisement object. The client device can execute the challenge's instructions to extract the $n^{th}$ byte from the advertisement, and to generate a challenge response that includes the extracted nth byte. The client device can generate a response packet that includes the challenge response, the client's public key, and an identifier for the broker, and signs the response packet using the broker's public key (operation 1610). The client device can provide the response packet to the data broker, and/or to a marketplace that matched the advertiser with the broker's advertising opportunity (operation 1612). In some embodiments, the client device encrypts the response packet using the broker's public key or its own private key. The broker decrypts the response packet, and examines the challenge response to determine if the client device has presented the advertisement. If the challenge response is valid, the broker can use the client's public key (or the broker's own private key) to generate a secret sauce that the client device can use to decode an encoded data stream.

The client device can disseminate the response packet across a named-data network to reach the broker and the marketplace. For example, the client device can generate an Interest packet that includes a routable name prefix associated with the broker and the marketplace, and encodes the response packet as a suffix of the Interest's a name. This way, when the client device disseminates the Interest packet across the NDN, the NDN routers can use the Interest's name prefix to forward the Interest to the broker and the marketplace. The broker and the marketplace can then extract the response packet from the Interest's name suffix.

Figure 17:
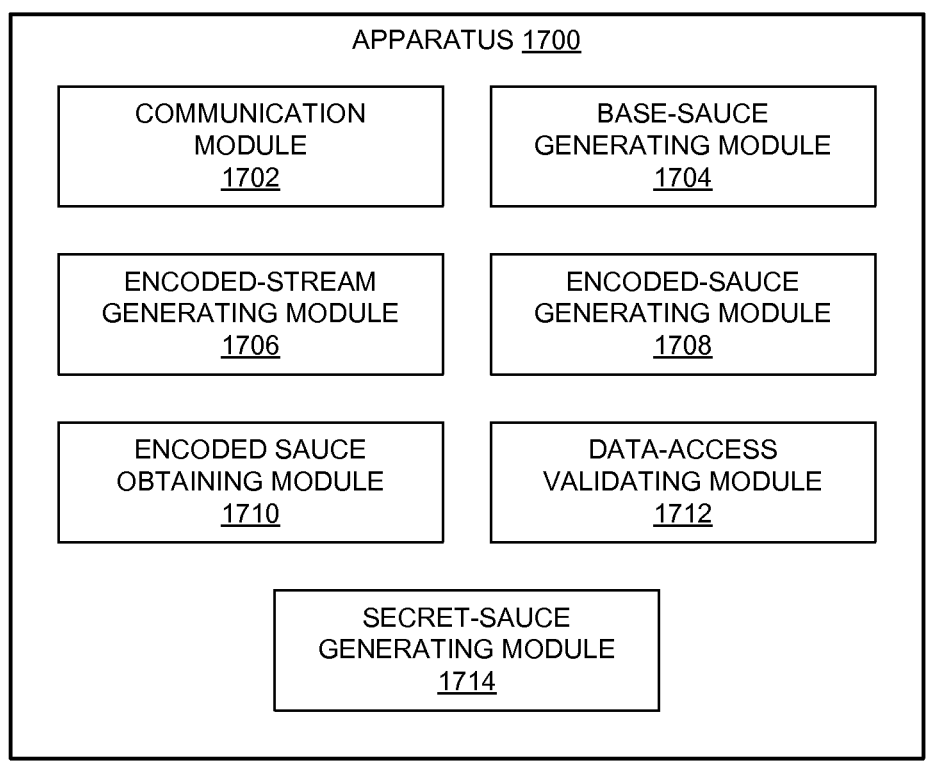
FIG. 17 illustrates an exemplary apparatus that facilitates brokering access to digital content in accordance with an embodiment.

FIG. 17 illustrates an exemplary apparatus 1700 that facilitates brokering access to digital content in accordance with an embodiment. Apparatus 1700 can comprise a plurality of modules which may communicate with one another via a wired or wireless communication channel. Apparatus 1700 may be realized using one or more integrated circuits, and may include fewer or more modules than those shown in FIG. 17. Further, apparatus 1700 may be integrated in a computer system, or realized as a separate device which is capable of communicating with other computer systems and/or devices. Specifically, apparatus 1700 can comprise a communication module 1702, a base-sauce generating module 1704, an encoded-stream generating module 1706, an encoding-sauce generating module 1708, an encoding-sauce obtaining module 1710, a data-access validation module 1712, and a secret-sauce generating module 1714.

In some embodiments, communication module 1702 can receive an Interest or request for a data stream, or for a secret sauce stream for an encoded data stream. Base-sauce generating module 1704 can generate a base sauce for encoding a data stream, and encoded-stream generating module 1706 can process the data stream using the base sauce to generate the encoded data stream. Encoding-sauce generating module 1708 can generate an encoding sauce that indicates instructions for generating a data-decoding secret sauce for a target entity.

Encoded-sauce obtaining module 1710 can receive a decoding sauce from a remote device, such as from a remote publisher. Data-access validating module 1712 can process an Interest or request for the data stream's secret sauce to determine whether the target entity has valid access to the data stream. Secret-sauce generating module 1714 can generate the secret sauce for the target entity responsive to data-access validating module 1712 validating the target entity's access to the data stream.

Figure 18:
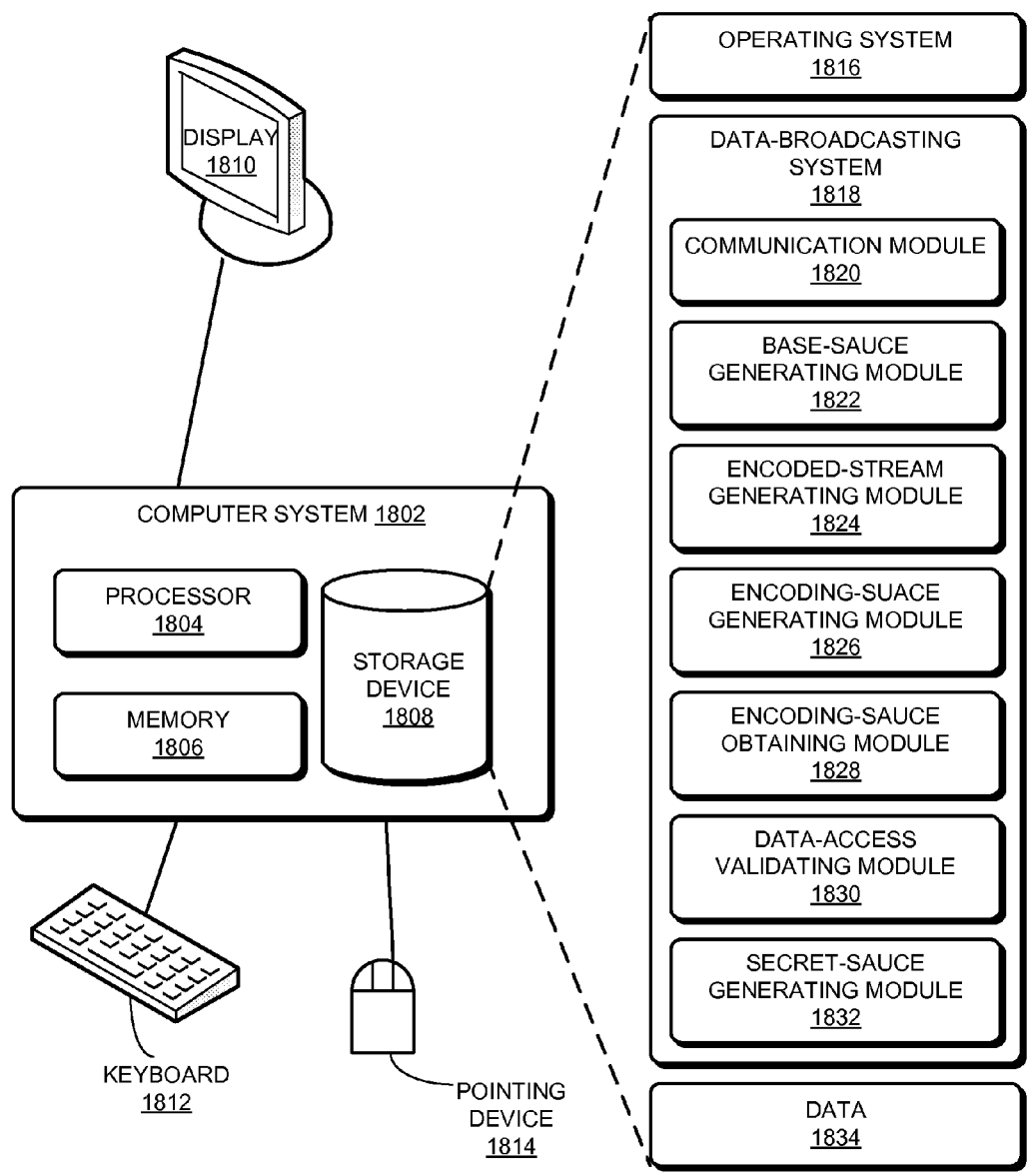
FIG. 18 illustrates an exemplary computer system that facilitates brokering access to digital content in accordance with an embodiment.

FIG. 18 illustrates an exemplary computer system 1802 that facilitates brokering access to digital content in accordance with an embodiment. Computer system 1802 includes a processor 1804, a memory 1806, and a storage device 1808. Memory 1806 can include a volatile memory (e.g., RAM) that serves as a managed memory, and can be used to store one or more memory pools. Furthermore, computer system 1802 can be coupled to a display device 1810, a keyboard 1812, and a pointing device 1814. Storage device 1808 can store operating system 1816, a data-broadcasting system 1818, and data 1834.

Data-broadcasting system 1818 can include instructions, which when executed by computer system 1802, can cause computer system 1802 to perform methods and/or processes described in this disclosure. Specifically, data-broadcasting system 1818 may include instructions for receiving an Interest or request for a data stream, or for a secret sauce stream for an encoded data stream (communication module 1820). Further, data-broadcasting system 1818 can include instructions for generating a base sauce for encoding a data stream (base-sauce generating module 1822), and can also include instructions for processing the data stream using the base sauce to generate the encoded data stream (encoded-stream generating module 1824).

Data-broadcasting system 1818 can include instructions for generating an encoding sauce that indicates instructions for generating a data-decoding secret sauce for a target entity (encoding-sauce generating module 1826). Data-broadcasting system 1818 can also include instructions for receiving a decoding sauce from a remote device, such as from a remote publisher (encoding-sauce obtaining module 1828).

Further, data-broadcasting system 1818 can include instructions for processing an Interest or request for the data stream's secret sauce to determine whether the target entity has valid access to the data stream (data-access validating module 1830). Data-broadcasting system 1818 can also include instructions for generating the secret sauce for the target entity responsive to determining that the target entity has valid access to the data stream (secret-sauce generating module 1832).

Data 1834 can include any data that is required as input or that is generated as output by the methods and/or processes described in this disclosure. Specifically, data 1834 can store at least a base sauce for encoding a base data stream, and an encoding sauce for the data stream. Data 1834 can also include the base data stream (e.g., a media stream), packets or Content Objects for the encoded data stream, and/or packets or Content Objects for a secret sauce stream corresponding to a target entity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
  receiving, by a data-brokering device, a request from a client device for access to a data stream published by a publisher;
  obtaining an identifier of the client device from the request, wherein the identifier includes at least one of a public key or a secure identifier;
  obtaining, from the publisher over a secure channel, an encoding stream that includes a plurality of extracted data segments that were extracted from the data stream;
  generating, by the data-brokering device, a watermark for each of the plurality of extracted data segments based on the identifier of the client device and the encoding stream
  generating, by the data-brokering device, a secret stream corresponding to the client device based on the encoding stream and the identifier of the client device, wherein the secret stream includes instructions to insert the plurality of extracted data segments and the generated watermarks into an encoded data stream received by the client device from the publisher; and
  providing the secret stream to the client device.

2. The method of claim 1, wherein the watermark is a digital watermark that encodes an identifier of an intended recipient.

3. The method of claim 1, further comprising:
  receiving, from the client device, an interest for the secret stream; and
  responsive to receiving the interest, applying the encoding stream to generate a secret stream content object satisfying the interest.

4. The method of claim 1, wherein the instructions of the secret stream map the plurality of extracted data segments to a byte offset of the encoded data stream.

5. A non-transitory, computer-readable storage medium storing instructions that, when executed by a computer, cause the computer to perform a method comprising:

receiving a request from a client device for access to a data stream published by a publisher;

obtaining an identifier of the client device from the request, wherein the identifier includes at least one of a public key or a secure identifier;

obtaining, from the publisher over a secure channel, an encoding stream that includes a plurality of extracted data segments that were extracted from the data stream;

generating a watermark for each of the plurality of extracted data segments based on the identifier of the client device and the encoding stream;

generating a secret stream corresponding to the client device based on the encoding stream and the identifier of the client device, wherein the secret stream includes instructions to insert the plurality of extracted data segments and the generated watermarks into an encoded data stream received by the client device from the publisher; and providing the secret stream to the client device.

6. The storage medium of claim 5, wherein the watermark is a digital watermark that encodes an identifier of an intended recipient.

7. The storage medium of claim 5, wherein the method further comprises:

receiving, from the client device, an interest for the secret stream; and responsive to receiving the interest, applying the encoding stream to generate a secret stream content object satisfying the interest.

8. The storage medium of claim 5, wherein the instructions of the secret stream map the plurality of extracted data segments to a byte offset of the encoded data stream.

9. A data-brokering apparatus, comprising:

one or more processors, and a non-transitory computer-readable medium, coupled to the one or more processors, having instructions stored thereon that, when executed by the one or more processors, cause the one or more processors to perform a method, the method comprising:

receiving, by the data-brokering apparatus, a request from a client device for access to a data stream published by a publisher;

obtaining an identifier of the client device from the request, wherein the identifier includes at least one of a public key or a secure identifier;

obtaining, from the publisher over a secure channel, an encoding stream that includes a plurality of extracted data segments that were extracted from the data stream;

generating, by the data-brokering apparatus, a watermark for each of the plurality of extracted data segments based on the identifier of the client device and the encoding stream;

generating, by the data-brokering apparatus, a secret stream corresponding to the client device based on the encoding stream and the identifier of the client device, wherein the secret stream includes instructions to insert the plurality of extracted data segments and the generated watermarks into an encoded the data stream received by the client device from the publisher; and providing the secret stream to the client device.

10. The apparatus of claim 8, wherein the watermark is a digital watermark that encodes an identifier of an intended recipient.

11. The apparatus of claim 8, wherein the method further comprises:

receiving, from the client device, an interest for the secret stream; and responsive to receiving the interest, applying the encoding stream to generate a secret stream content object satisfying the interest.

12. The apparatus of claim 8, wherein the instructions of the secret stream map the plurality of extracted data segments to a byte offset of the encoded data stream.

13. The method of claim 1, wherein the providing is performed responsive to determining that the client device has valid access privileges.

14. The method of claim 1, wherein the plurality of extracted data segments were extracted from every $n^{th}$ byte of the data stream.

15. The method of claim 1, wherein the plurality of extracted data segments are randomly selected data blocks of the data stream.

16. The storage medium of claim 5, wherein the plurality of extracted data segments were extracted from every $n^{th}$ byte of the data stream.

17. The storage medium of claim 5, wherein the providing is performed responsive to determining that the client device has valid access privileges.

18. The apparatus of claim 8, wherein the plurality of extracted data segments were extracted from every $n^{th}$ byte of the data stream.

19. The apparatus of claim 8, wherein the providing is performed responsive to determining that the client device has valid access privileges.

20. The apparatus of claim 8, wherein the plurality of extracted data segments are randomly selected data blocks of the data stream.

* * * * *